US007285048B2

(12) United States Patent
Karmarkar

(10) Patent No.: US 7,285,048 B2
(45) Date of Patent: Oct. 23, 2007

(54) RESTRICTED MULTIMEDIA EPISODE DISTRIBUTION WITH SYNTHETICALLY GENERATED RANDOM OUTCOMES TO PLAYERS WITH INTRA-EPISODE BIOMETRIC IMAGE BASED AUTHENTICATION

(76) Inventor: Jayant S. Karmarkar, 712 Via Palo Alto, Aptos, CA (US) 95003

( * ) Notice: Subject to any disclaimer, the term of this patent is extended or adjusted under 35 U.S.C. 154(b) by 0 days.

(21) Appl. No.: 10/264,623

(22) Filed: Oct. 3, 2002

(65) Prior Publication Data

US 2003/0109306 A1 Jun. 12, 2003

Related U.S. Application Data

(63) Continuation of application No. 09/336,056, filed on Jun. 18, 1999, now Pat. No. 6,508,709.

(51) Int. Cl.
*A63F 9/24* (2006.01)
*A63F 13/00* (2006.01)
*G06F 17/00* (2006.01)
*G06F 19/00* (2006.01)

(52) U.S. Cl. ........................................................ 463/42

(58) Field of Classification Search .................. 463/40, 463/41, 42, 43, 1, 22, 26, 29; 434/128, 129
See application file for complete search history.

(56) References Cited

U.S. PATENT DOCUMENTS 3,998,309 A 12/1976 Mandas et al. ............... 194/97
4,095,795 A 6/1978 Saxton et al. ............... 273/143
4,448,419 A * 5/1984 Telnaes ....................... 463/21
4,449,189 A 5/1984 Feix et al.
4,467,424 A * 8/1984 Hedges et al. ................ 463/26
4,521,014 A 6/1985 Sitrick
4,662,635 A 5/1987 Enokian
4,710,873 A 12/1987 Breslow et al.
4,773,024 A 9/1988 Faggin et al.
5,012,522 A 4/1991 Lambert
5,259,613 A 11/1993 Marnell, II
5,280,909 A * 1/1994 Tracy ......................... 463/27

(Continued)

FOREIGN PATENT DOCUMENTS

EP 478412 6/1998

(Continued)

OTHER PUBLICATIONS

The Gaming Industry. International Gaming Institute. John Wiley & Sons, Inc. New York: 1986, Chapter 3 pp. 59-101.*

(Continued)

*Primary Examiner*—Robert E. Pezzuto
*Assistant Examiner*—Omkar A. Deodhar

(57) ABSTRACT

Remote-player virtual gaming is provided, off-site or on-site casino premises, using randomly selected entertaining multimedia gaming episodes, with randomly generated gaming outcomes. The randomly selected gaming episodes could be from a database or from randomly selected ongoing games. The database could be preprocessed casino surveillance audio-video or recordings depicting a hired cast of entertainers playing a broad variety of games of chance and skill. Relevant functionality includes authorized server based secure outcome distribution, gaming stations enabling intra-episode biometric (e.g., face) authentication and accounting systems for rewarding authorized remote-players with products, services, playtime or cash.

39 Claims, 17 Drawing Sheets

U.S. PATENT DOCUMENTS

| | | | | | |
|---|---|---|---|---|---|
| 5,411,258 | A | * | 5/1995 | Wilson et al. | 463/6 |
| 5,456,465 | A | | 10/1995 | Durham | 173/138 |
| 5,586,937 | A | | 12/1996 | Menashe | 463/41 |
| 5,611,730 | A | | 3/1997 | Weiss | 463/20 |
| 5,655,961 | A | | 8/1997 | Acres et al. | 463/27 |
| 5,759,103 | A | | 6/1998 | Freels et al. | 463/42 |
| 5,761,647 | A | | 6/1998 | Boushy | |
| 5,762,552 | A | | 6/1998 | Vuong et al. | |
| 5,770,533 | A | | 6/1998 | Franchi | 463/42 |
| 5,795,228 | A | * | 8/1998 | Trumbull et al. | 463/42 |
| 5,797,795 | A | | 8/1998 | Takemoto et al. | 463/42 |
| 5,800,268 | A | * | 9/1998 | Molnick | 463/40 |
| 5,820,459 | A | | 10/1998 | Acres et al. | 463/25 |
| 5,820,461 | A | | 10/1998 | Pernatozzi | 463/16 |
| 5,873,781 | A | | 2/1999 | Keane | 463/22 |
| 5,916,024 | A | * | 6/1999 | Von Kohorn | 463/40 |
| 6,001,016 | A | * | 12/1999 | Walker et al. | 463/42 |
| 6,004,211 | A | * | 12/1999 | Brenner et al. | 463/40 |
| 6,099,408 | A | * | 8/2000 | Schneier et al. | 463/29 |
| 6,183,362 | B1 | | 2/2001 | Boushy | |
| 6,213,877 | B1 | * | 4/2001 | Walker et al. | 463/26 |
| 6,234,900 | B1 | | 5/2001 | Cumbers | |
| 6,273,820 | B1 | | 8/2001 | Haste, III | |
| 6,312,332 | B1 | * | 11/2001 | Walker et al. | 463/23 |
| 6,315,660 | B1 | | 11/2001 | DeMar et al. | |
| 6,315,668 | B1 | | 11/2001 | Metke et al. | |
| 6,375,568 | B1 | | 4/2002 | Roffman et al. | |
| 6,409,599 | B1 | | 6/2002 | Sprout et al. | |
| 6,422,563 | B1 | | 7/2002 | Fairchild et al. | |
| 6,425,825 | B1 | | 7/2002 | Sitrick | |
| 6,450,885 | B2 | | 9/2002 | Schneier et al. | |
| 6,500,068 | B2 | | 12/2002 | Walker et al. | |
| 6,503,145 | B1 | | 1/2003 | Webb | |

FOREIGN PATENT DOCUMENTS

| | | |
|---|---|---|
| WO | WO9919027 | 4/1999 |

OTHER PUBLICATIONS

"Rounders", TVguide.com. 1998 [online] Retrieved from the Internet on [Sep. 25, 2003] URL:<wysiwyg://124http://www.tvguide.com/movies/database/ShowMovie.asp?Mi=40742>.*

PL 93-579, Dec. 31, 1974, 88 State 1896.*

Schwarts, David, Ryan, Steve, and Fred Wostbrock. "Hollywood Squares". The Encyclopedia of TV Game Shows. Checkmark Books. New York: 1999, pp. 95-97.*

"Rounders", TVguide.com. 1998 [online] Retrieved from the Internet on [Jan. 23, 2007] URL:<http://www.tvguide.com/detail/movie.aspx?tvobjectid=133515>.*

Karmarkar, J. eta al, "Cost-effective implementation of passive algorithms on general purpose parallel architectures" SPIE vol. 1956, Sensor Fusion and Aerospace Applications, Apr. 1993, pp. 38-47.

Epstein, R. "The Theory of Gambling and Statistical Logic" Academic Press, 1977.

Marian Green, "Server-based Gaming", International Gaming and Wagering Business (IGWB), May 2003, p. 24-27.

Marian Green "The Other Guys", Slot Manager Magazine, p. 10, Apr. 2003.

Stations Casino product that automates the card table dealer by using a camera sensor to provide a live view of the dealer and table to remote wagering-players on a game-by-game basis.

Casino Floor Gaming Stations from various companies (Circa 2003: Cyberview, Amatick Octavian, Kare, Interblock, Coinmaster).

Karen Thomas, "USA Today" Jun. 17, 2003 Article entitled: "Celebrities Morphing into Video-Game Stars.".

* cited by examiner

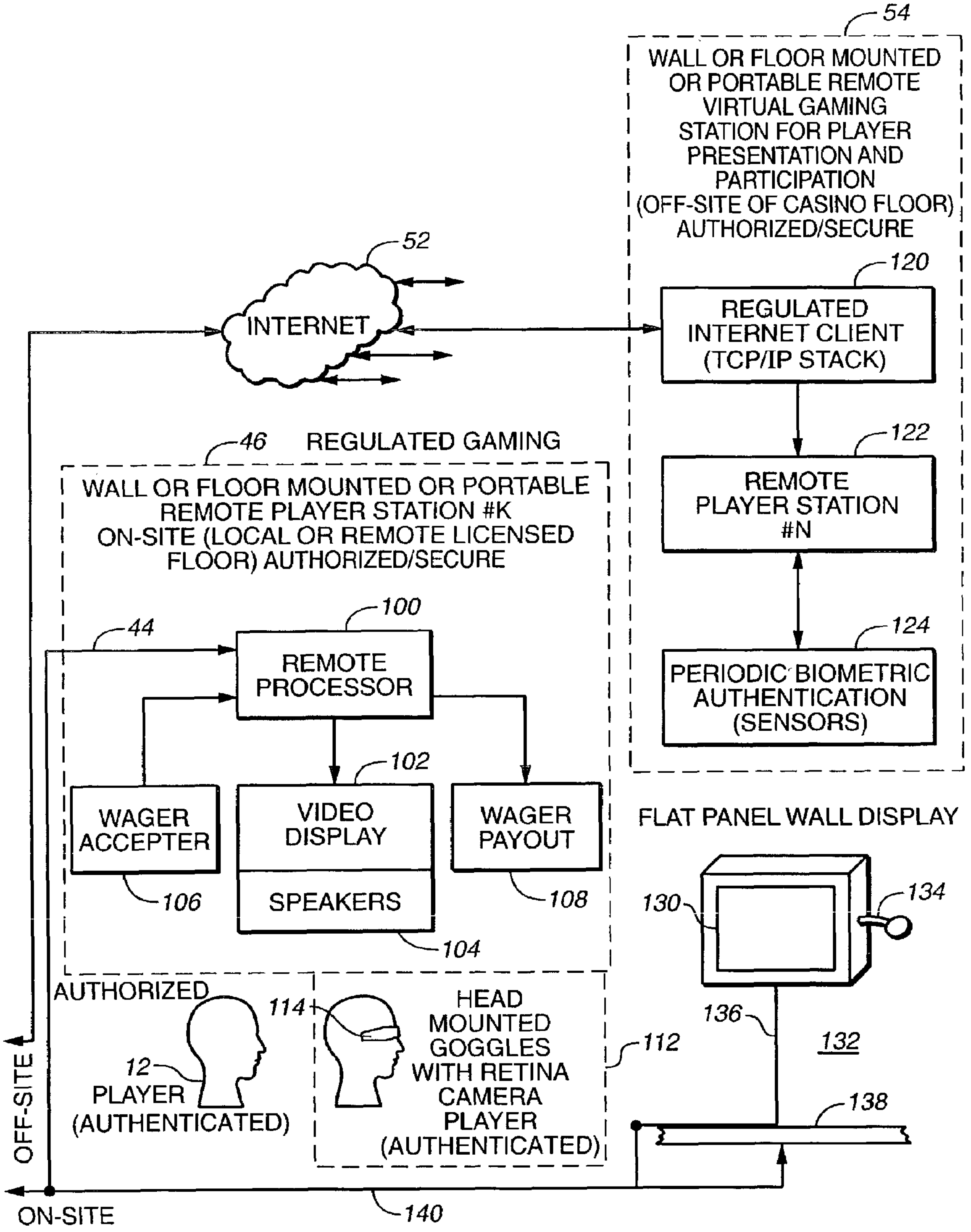
FIG._1C
FIG._1
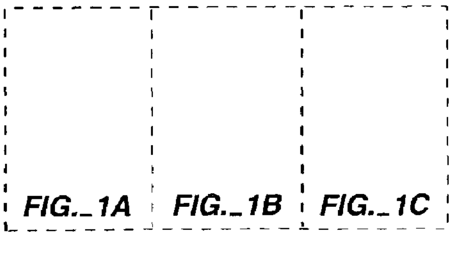

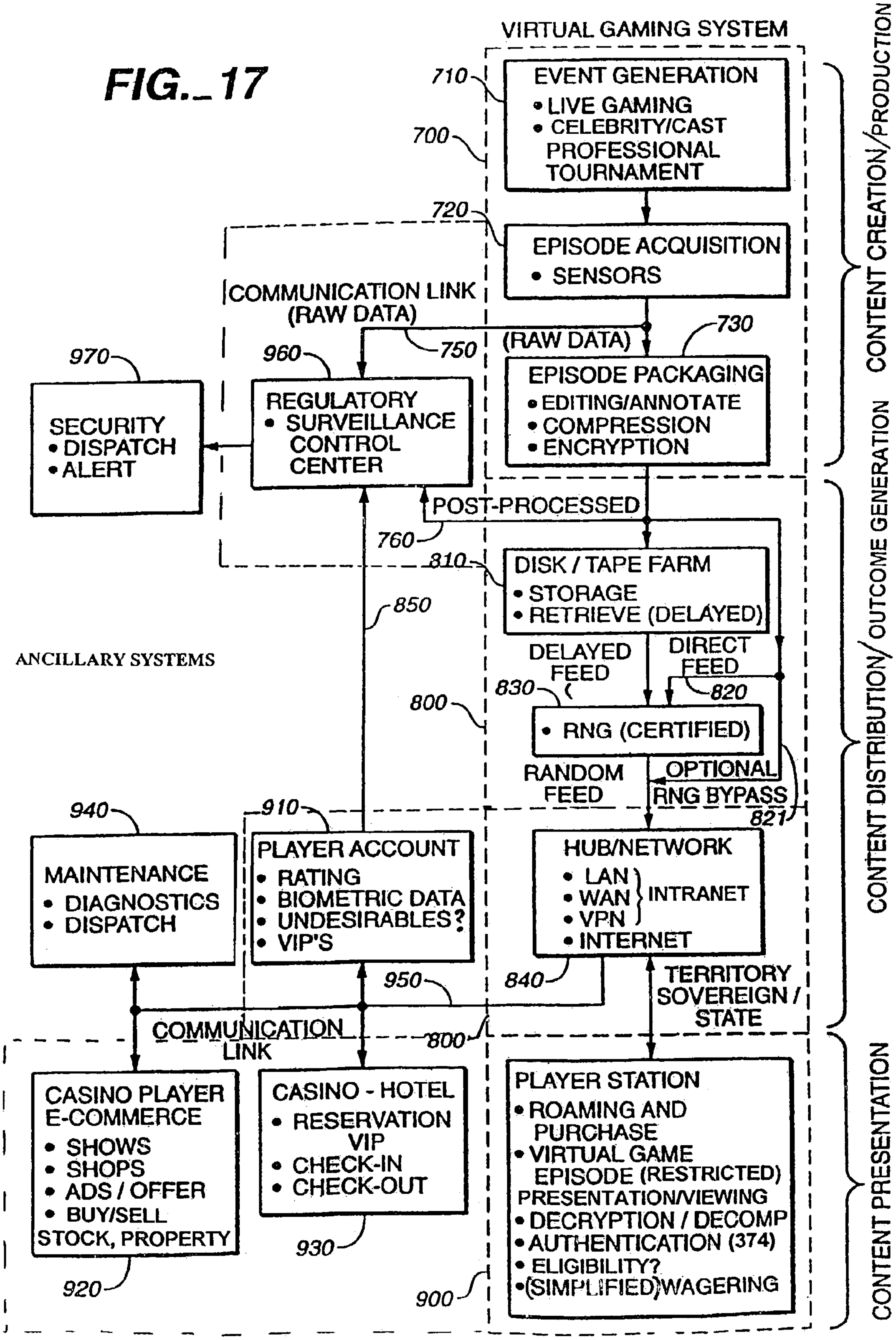

FIG._17
VIRTUAL GAMING SYSTEM
710
700
EVENT GENERATION
• LIVE GAMING
• CELEBRITY/CAST
PROFESSIONAL
TOURNAMENT
720
EPISODE ACQUISITION
• SENSORS
COMMUNICATION LINK
(RAW DATA)
750
(RAW DATA)
730
EPISODE PACKAGING
• EDITING/ANNOTATE
• COMPRESSION
• ENCRYPTION
970
SECURITY
• DISPATCH
• ALERT
960
REGULATORY
• SURVEILLANCE
CONTROL
CENTER
POST-PROCESSED
760
810
DISK / TAPE FARM
• STORAGE
• RETRIEVE (DELAYED)
850
ANCILLARY SYSTEMS
DELAYED
FEED
DIRECT
FEED
830
820
800
• RNG (CERTIFIED)
RANDOM
FEED
OPTIONAL
RNG BYPASS
821
940
910
MAINTENANCE
• DIAGNOSTICS
• DISPATCH
PLAYER ACCOUNT
• RATING
• BIOMETRIC DATA
• UNDESIRABLES?
• VIP'S
HUB/NETWORK
• LAN
• WAN
• VPN
INTRANET
• INTERNET
950
840
TERRITORY
SOVEREIGN /
STATE
COMMUNICATION
LINK
800
CASINO PLAYER
E-COMMERCE
• SHOWS
• SHOPS
• ADS / OFFER
• BUY/SELL
STOCK, PROPERTY
920
CASINO - HOTEL
• RESERVATION
VIP
• CHECK-IN
• CHECK-OUT
930
PLAYER STATION
• ROAMING AND
PURCHASE
• VIRTUAL GAME
EPISODE (RESTRICTED)
PRESENTATION/VIEWING
• DECRYPTION / DECOMP
• AUTHENTICATION (374)
• ELIGIBILITY?
• (SIMPLIFIED) WAGERING
900
CONTENT CREATION/PRODUCTION
CONTENT DISTRIBUTION/OUTCOME GENERATION
CONTENT PRESENTATION

RESTRICTED MULTIMEDIA EPISODE DISTRIBUTION WITH SYNTHETICALLY GENERATED RANDOM OUTCOMES TO PLAYERS WITH INTRA-EPISODE BIOMETRIC IMAGE BASED AUTHENTICATION

This is a continuation application of U.S. Application Ser. No. 09/336,056 filed Jun. 18, 1999 now U.S. Pat. No. 6,508,709.

BACKGROUND OF THE INVENTION

1. Field of the Invention

This invention relates to virtual regulated casino-type gaming systems and business processes and, more particularly, to an improved casino on-site, regulated off-site and regulated Internet remote gaming experience.

2. Prior Art

A Hodges et al. U.S. Pat. No. 4,446,424 discloses a remote gaming system for use with a wagering or gambling establishment such as a casino. A player participates in a selected one of a plurality of live wagering games from a remote location. The system includes a croupier station, a credit station, and a remotely located player station. The player station includes a live game display for displaying a selected one of a plurality of games being played at the croupier station, such as craps, roulette, or keno. The player station includes a separate, changeable playboard for displaying a selected one of a plurality of wagering possibilities corresponding to a selected one of the plurality of games being played and for displaying the results of the game being played at the croupier station. The player station also includes a microprocessor for controlling the operation of the live game display and the operation of the separate, changeable playboard. The betting decisions required by the remote player for the croupier games are just as complicated as the actual games and no card games are mentioned. The Hodges et al. system is not practical because state gaming laws also require that the eligibility of a remote player be initially established and also be periodically verified by security personnel. No mention is made in the Hodges et al. patent for any player authentication at the remotely located player station, such as a hotel room, or convenience store or other "licensable" off-site locations.

A Molnick Patent, U.S. Pat. No. 5,800,268, also discloses a method by which a remote player may participate in a live casino game from a location remote from a casino. A player establishes an information link with a casino from an interface station which includes a video monitor and a keypad, where the keypad is game specific and unchangeable. The Molnick patent also uses cameras and discloses table card games. The betting scheme of Molnick is just as complicated as the actual table game. The system of Molnick is also not practical. While modems and phones lines are used, compression and encryption are not. Molnick also does not use player eligibility authentication. Molnick displays to the remote player an entire gaming table with a number of "live" players, which would enable card counting and team playing by the remote players, both of which are not acceptable to casinos.

A need exists for a practical remote casino-type gaming system that would meet state gaming regulations, which are promulgated mainly to ensure the fairness of the game and eligibility of the players, such as age and creditworthiness. A need also exists for a system which would provide a smooth progression from regulated casino gaming to regulated remote on-site and off-site gaming and eventually to regulated Internet gaming.

SUMMARY OF THE INVENTION

It is therefore an object of the invention to provide a practical but remote player-friendly casino-type gaming system that meets the gaming legal regulations, as promulgated by the various governmental jurisdictions. The key benefits are: (a) ease of play, (b) retains most of the excitement of actual live participation, (c) ability to control rate of play, thereby reducing player stress, (d) ensures a greater level of privacy, thereby limiting embarrassment, (e) better utilization of the existing personnel and facility infrastructure, (f) enables gaming multimedia video product creation, advertising and branding by the casino, (g) enables regulated off-site gaming, including Internet, and (h) facilitates effective novice player education.

Some of the technical features of a system according to the invention include data compression with a video Codec using, for example, J/MPEG and other application-specific compression techniques. Data encryption is provided using, for example, DES 128 and strong RSA encryption. Various communication pathways are used such as copper, fiber-optic, and wireless, to interconnect the disclosed subsystems. Various communication network protocols (e.g., IEEE 802.XX, ITU/CCITT V Series protocol, TCP/IP) and network topologies (e.g., ring, star) are used to implement networks such as, for example, LAN, WAN, VPN, Cable Modems, ADSL, Satellite (e.g., QAM), Internet, wherein the forward path from the multimedia video source needs, for example, about one megabyte per second (1 MB/sec) data bandwidth capability and the return path needs capability in the range of about ten kilobytes per second (10 KB/sec), with further reductions provided with evolving MPEG.x technology. A communication distribution hub enables multiple games to be fed in and routed to multiple remote player stations. Legally certified random number generators (RNGs) are uses to randomly select one source for video multimedia signals from several incoming gaming video multimedia sources, in an autonomous manner, for each game episode presented to the remote player, at the remote player station.

The system includes a number of features. Virtual gaming at a remote site uses legally randomized live video or pre-recorded video. Pre-recorded video could be obtained from prior casino security video storage tapes or from tapes of closed regulated tournaments. If a random pre-recorded gaming episode is selected by the remote player, then its playback can be slowed down to reduce player stress. A remote on-site or off-site player bets, for or against, a live player while viewing either a live casino video signal or a pre-recorded casino video from any secure multimedia storage repository (e.g., disk, tape). Wagering rules for the games are simple as compared to more complicated live casino game wagering rules resulting in a new way of wagering on existing games, as well as the creation of new wagering games. Due to the simplicity of the betting rules, a remote player can concurrently play several dissimilar games at the same remote gaming station. The remote player can, in effect, virtually roam around a casino and virtually participate in a plurality of games without leaving the remote gaming station.

For remote gaming stations off-site of the casino premises, the remote gaming station is periodically monitored and recorded with a return path multimedia video camera/ audio channel. Various biometric sensing systems are also used to validate a player's identity. By using currently available videotapes or disks of all licensed table games that are recorded and stored as per currently promulgated regulatory requirements, surveillance and security functions for all the live casino tables can be cost-shared with the disclosed remote gaming system. Casino surveillance and security is enhanced by the superior quality of the live game multimedia video data used for the disclosed remote gaming station purposes. The off-site remote gaming player station is at the same security level as a bank ATM machine, perhaps including even the co-located security guards. The touch screen is spill and shatterproof and an audible alarm makes the remote player stations substantially tamperproof.

The multimedia video data stream for a live or prerecorded game can be processed in real-time to generate and remotely display multimedia synthetic video signal which show, for example, enhanced images of cards, dice or roulette, as well as the progress and outcome of selected live or pre-recorded casino games.

Regulated live play or pre-recorded restricted access storage repository-based multimedia video, of hired casino shills or invited professional gamblers or invited celebrities at the gaming tables, enables a licensed casino to become a provider of multimedia gaming content, certified by government gaming authorities, similar to the movie/television entertainment production industry. The equipment required includes that which is currently used in the entertainment video production, video cable-based and Internet-based video content delivery systems. Moreover, in an instructional mode of operation, novice players are instructed by example, on how to play the various games in a relatively stress-free environment, by recognized gaming experts. Moreover, the video presentation can be slowed down to enable ease of viewing of the gaming action for a novice player.

The present invention includes a legally-authorized remote gaming system which includes a multimedia video source at a casino which provides a live video or prerecorded restricted-access video signal depicting a legally-authorized live casino game. A player accounting and tracking subsystem manages the accounts, player compensation rating and surveillance for a remote off-site player, as well as the on-site player on casino premises. A communication distribution hub connects the multimedia video source and the player accounting and tracking subsystem to the remote player station. The remote player station includes a display for displaying to a remote player the live multimedia video or the pre-recorded multimedia video signal depicting the legally-authorized, live or pre-recorded, actual casino game. The remote player station also provides gaming information which enables the remote player to place a bet and otherwise provide inputs via a touchscreen or other means. The remote player station also provides gaming information to enable the remote player to receive a payout by electronic means or by mechanical means for the casino game currently being displayed on the station display. Moreover, the display can be a conventional color monitor or a stereo 3D head mounted goggles. The goggles can also be used to restrict viewing access, to only the eligible individual players. Biometric sensors can also be incorporated into the head-mounted remote player station. Furthermore, the entire remote player station can be wall-mounted, to facilitate ease of installation and better space utilization.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 17 is a comprehensive functional block diagram of the disclosed multimedia virtual gaming method and system, including interconnections to other casino-based systems.

DETAILED DESCRIPTION OF THE PREFERRED EMBODIMENTS

Figure 1A:
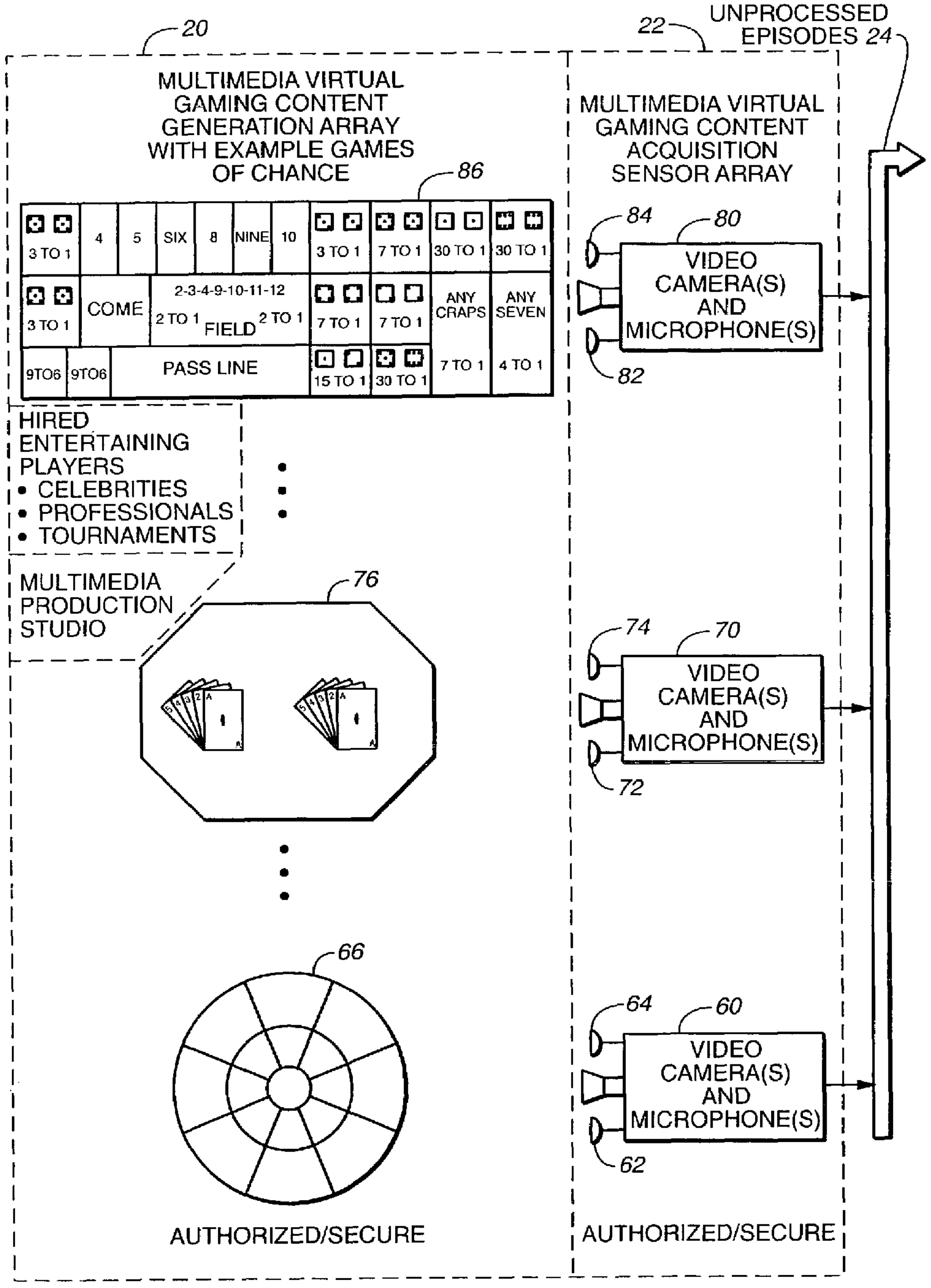
FIG. 1 is a comprehensive schematic block diagram illustrating a remote virtual gaming system which uses actual regulated casino live games or prerecorded actual casino games.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

The psychology of what makes a particular game "exciting" to a player is not clearly understood, as conceded even by veterans in the casino business. A typical approach to validating the attractiveness and consequently the potential success of a game is to conduct for a few months an expensive "field trial" on a casino floor and to monitor the "excitement and appeal" of the game, in terms of player usage and the consequential generation of actual revenue. However, this inventor asserts that a simplistic betting scheme involving only a minuscule amount of decision-making in a non-confrontational non-public environment is preferred by most players. This hypothesis is validated by economic data that about two-thirds of a casino's revenue is attributed to slots in contrast to revenue obtained from table games (e.g., cards) and other games (e.g., craps, keno, roulette). Moreover, due to the complexity of the required gaming infrastructure (e.g., equipment, trained personnel), the profit margin for slots is about twice that for all of the other games. On the other hand, many players, particularly younger players below the age of forty, consider video slot gaming to be quite boring.

The present invention makes the playing of non-slot games into "no-brainers" like slot games, without also eliminating the player "excitement and appeal" that non-slot games generate, so that a player can participate without the stress and potential public shame arising from a player's misjudgment and associated losses at a live gaming table. No other player can see what any particular player has lost, just like at a slot machine, and without player tracking, even the casino doesn't know. On the other hand, the present invention does not preclude the welcome recognition and acclaim that casinos typically bestow on winners in the casino.

An additional incentive for casinos to implement this invention is that they have a substantial long standing/traditional investment in non-slot gaming and it is generally acknowledged that non-slot gaming needs to improve its return on investment (ROI). However, the recent advent of unregulated Internet-based gaming with its computer-based random number generators (RNG) has put tremendous uncertainty into the previously sound business rationale for making "billion dollar" (co-located casino/hotel/entertainment/shopping) fixed casino investments. Moreover, RNG-driven video slots can be inexpensively replicated by thousands of unregulated entities on the Internet, subject only to mostly unenforceable regulatory issues, while it takes a substantial capital investment to maintain a live table (e.g., cards, craps, roulette) gaming facility with the associated player "excitement and appeal", that can only be generated by a live casino type of operation.

Figure 1B:
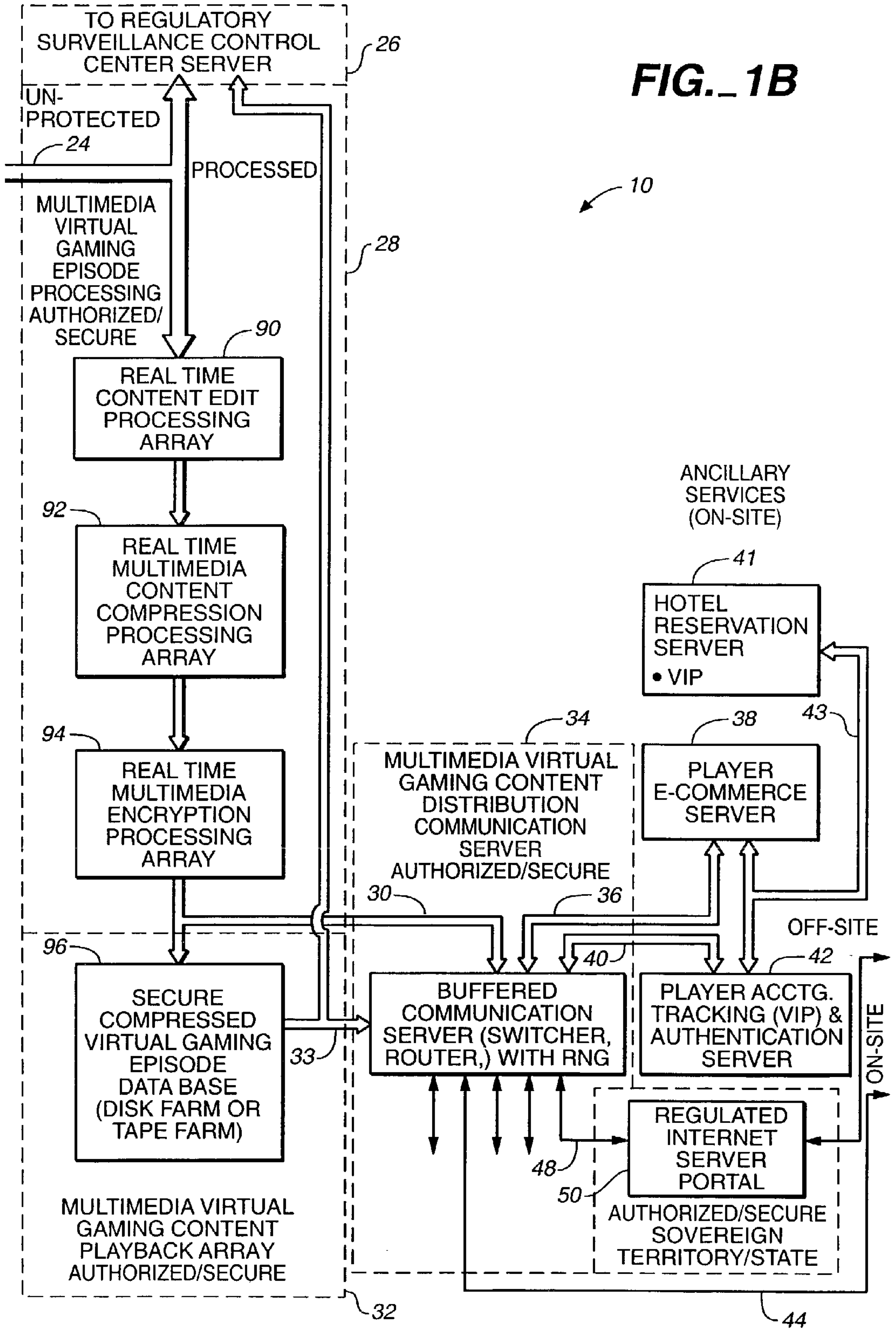

FIG. 1 illustrates a remote multimedia distributed, virtual gaming system 10 which interacts with a remote player 12. The system includes a multimedia virtual gaming content generation array 20 which is monitored by a virtual multimedia content acquisition sensor array 22. The outputs of the sensor array 22 are sent on a data/signal bus 24 to a regulatory surveillance control center server 26 and to a raw multimedia virtual gaming episode processing array 28. Processed output signals from the processing array 28 are sent on a bus 30 to a multimedia virtual gaming content playback array 32 for storage or directly to a multimedia virtual gaming content distribution center server, or hub, 34. Alternatively, a bus 33 provides stored processed signals to the hub 34 and to the surveillance control center server 26. The distribution center server is connected by a bus 36 to a player E-commerce server 38 and by a bus 40 to a player accounting, VIP tracking, and authentication server 42. A hotel reservation server 41 is connected through a bus 43 to the player E-commerce server 38 and to the player accounting, VIP tracking, and authentication server 42. The hotel reservation server 41 provides VIP player information to the accounting server 42. These servers 38, 41, 42 provide ancillary services to the system 10. The communication server includes a random number generator which randomly selects game content. The communication server 34 is connected by a virtual private network (VPN) signal line 44 to a remote player station 46 on the casino gaming premises. The communication server 34 is also connected by a signal line 48 to a regulated Internet server portal 50, which is connected through the Internet 52 to a remote virtual gaming station 54, which is located off of the casino floor site and which provides for presentation of games to a player, and which provides for player participation.

FIG. 1 provides a remote multimedia virtual gaming system 10 which presents a remote player 12 with virtual gaming video and audio information from actual casino games. By actual casino games is meant games which are actually being played by real players or restricted access pre-recorded games which have been actually but previously played by real players, both of which are played in a real, licensed casino or in a licensed restricted access tournament (e.g., invitation-only high stakes poker, celebrity poker). The multimedia gaming system uses live video and live audio presentations to provide a live casino environment to the remote player 12. Alternatively, pre-recorded restricted access video and audio are played back to the remote player 12 in an autonomous legally randomized sequence to provide a licensable virtual casino gaming environment.

The content generation array 20 diagrammatically shows three exemplary casino games being monitored/acquired according to the invention using the multimedia content acquisition sensor array 22 comprised of either analog or digitized video and audio sensors. A first live video image sensing camera system 60 and a first pair of stereo audio sensing microphones 62, 64 monitor a live roulette game table 66 in a licensed casino. A second live video image sensing camera system 70 and a second pair of stereo audio sensing microphones 72, 74 monitor a live card game table 76 in a licensed casino or at a tournament. A third live video image sensing camera system 80 and a third pair of stereo audio sensing microphones 82, 84 monitor a live craps game table 86 in the licensed casino. The video image sensing camera systems 60, 70, 80 are, for example, one or more (e.g., stereo mode) color and/or black and white video cameras commercially provided by companies such as Sony, Panasonic, CoStar, Kodak and Hitachi, with a nominal digital resolution of 640×480 (comparable to current consumer TV) pixels (or more), compliant with any video format, including NTSC, PAL, DTV, ATSC or other appropriate SMPTE standard, selected by those skilled in the art.

The output of this multimedia acquisition sensor array 22 is then processed in the processing array 28 to create a virtual gaming episode package for each game. The first step in this process is performed in a real-time content edit processing array 90 to, autonomously or manually, rapidly edit out images and audio that detract and distract from the game, including information that may enable the viewer (e.g., remote player) of the video to identify the individual live player, due to privacy considerations. Then this game episode captured on tape or computer memory is compressed in a real-time multimedia content compression processing array 92 using J/MPEG (or equal) for video and MP3 (or equal) for audio or other appropriate SMPTE standard as approved by the appropriate regulatory agency. Then the compressed episode is encrypted in a real-time multimedia encryption processing array 94 using DES (e.g., 128 bit), and/or RSA (e.g., 1024 bit public key exchange) or any authorized encryption standard, as per the gaming control board (GCB) that has jurisdiction. Note that the underlying theoretical foundation for encryption and RNG are related. The required video rate (e.g., 30 Hz) edit/compress/encrypt preferred by TV studio quality equipment can be purchased from Sony, Panasonic, JVC, Tektronics, Quantel, AVID or equal. This, preferably real-time, encrypted/compressed/edited multimedia game episode package is then stored in the playback array 32 on a disk, tape, or CD, or any other secure storage media for subsequent gaming content distribution. This episode package can also be directly routed, in near real-time, to the content distribution center server, or multimedia communication/distribution hub, 34.

The securely encrypted and compressed live video and audio signals from the video camera systems and the stereo microphones are also connected to, recorded, and then subsequently played back with a VCR array, hard disk array or solid state disk array, as typically illustrated by utilizing a secure, compressed virtual gaming episode data base using disk or tape farm system 96. The VCRs are commercially provided by Sony, Magnavox, Panasonic, RCA and others. The disks are provided by Seagate, Maxtor, Quantum, Loronics, IBM and others. Other bulk storage media include optical and DVD, from Toshiba, JVC and others.

The multimedia communication distribution hub 34 has a number of input/output (I/O) ports connected, directly or indirectly, to the I/O ports of the cameras, microphones, and disk/tape VCRs. The multimedia communication distribution hub 34 controls distribution of video, audio, and control signals. The communication hub 34 also functions as a switching router with audio/video output signals being selected from inputs provided by video camera systems or disk/VCRs, using a random selection method controlled by a certified random number generator (RNG), of the numerous multimedia video packets. The communication hub 34 is, for example, a bank of video, analog or digital, switches commercially provided by companies such as Cisco, Lucent, Maxim, Brocade, Gennum, Elantec or Analog Devices, controlled by a certified RNG, running on a fast microprocessor such as a 400 MHz Intel Pentium II microprocessor from Intel, IBM, Compaq or equivalent from Sun, Motorola or others. The communication hub 34 functions as a RNG driven multiport switch for selecting among incoming multimedia video channels to outgoing distribution channels, including 1000 base-T fiber-optic or video coax or copper wired or wireless (spread spectrum) transceivers or other physical layer communication pathways.

The communication hub 34 has an I/O port which is connected by a virtual private network (VPN) signal line 44, which provides a wired, fiber-optic, wireless, or other connection link to the main input port of the remote player station 46. The security of the remote player station 46 is controlled by the casino, by virtue of it being on the casino gaming premises or by being under the direct physical control of the casino, such as in a casino hotel room that has appropriate sensors, as described later. The communication connection link 44 is, for example, a fiber-optic 1000 base-T rated cable or equivalent communication pathway. Various communication protocols (e.g., IEEE, 802.XX, ITU/CCITT V Series) and topologies (e.g., star, ring) can be used to implement the required secure authorized virtual private network interprocessor connectivity.

The remote on-site player terminal 46 includes a remote processor 100 which performs appropriate command, control and routing functions. The remote processor 100 sends video, audio and control signals to a video monitor 102 and to speakers 104. A wager acceptor subsystem 106 and a wager payout 108 subsystem provide betting information and payouts to the remote player 12. The remote processor 100 is a 16 to 128 bit microprocessor from Intel, AMD, Lucent, Texas Instruments, Phillips, Motorola, Hitachi, Sony, SGI, Sun or equal, using various real-time operating system (OS) software such as Windows CE (from Microsoft), PSOS (from Integrated Systems), Inferno (from Lucent), or any secure compact real-time operating system, that has been approved by a governmental gaming control board GCB. The remote processor and associated I/O interface 100 can also be implemented using field programmable gate arrays (FPGA's) from Altera, Xylinx, Lucent or equal. Using FPGA's provides an additional level of security by protection (e.g., tamper-proofing). The remote processor 100 is coupled to the video monitor 102 with an 8 Mbyte buffered memory display screen with a 256×256 point or better touch screen provided by Microtouch or equivalent. Alternatively, a monoscopic or stereoscopic (3D) color or black and white display is presented to a player 112 with head-mounted goggles 114. Typically, no remote terminal disk, CD, or tape drive usage is required by the designer to implement the functionality, nor is it encouraged by the regulators. The remote player station 46 is contained in a tamperproof, rugged, spill-proof, alarmed safe-like enclosure.

Another I/O port of the communication hub 34 is connected by the signal line, or communication link 48 to an I/O port of an authorized Internet server 50, located in a legally sanctioned gaming property in a sovereign state or Native American territory, which communicates through the Internet media 52 with a 2-wire or 4-wire telephone cable or other secure communication link to an off-site licensed Internet remote player station 54. The regulated Internet remote off-site player station 54 includes an Internet client Transmission Control Protocol/Internet Protocol (TCP/IP) stack 120, a remote player station 122 (similar to the on-site casino station noted above), and biometric authentication equipment 124, from Sensar or equal for retinas, from Digital Privacy or equal for fingerprints, from Symbol Technology or equal, for 2D bar code based photo ID/driver's license, which are used jointly or severally, to continuously (e.g., every 5 seconds) verify the identity and eligibility of the player at that remote station. The off-site player station 54 or the remote player station 46 array include a flat panel plasma or liquid crystal or cathode ray tube video display 130 such as commercially provided by Sony, Sharp, Fujitsu, NEC, Toshiba, or equivalent with a touchscreen provided by Microtouch or equal and typically shown in FIG. 1. The off-site player station 122 typically has no disk, CD, or tape drive, while being enclosed in a tamperproof ATM kiosk-like container, otherwise functionally similar to the on-site player station 46.

The flat panel plasma or liquid crystal or cathode ray tube video display 130 is adapted to be mounted, for example, on a wall 132 of a casino premises. In this case, the flat panel video display is part of a gaming station which is connected by a cable 134 or, alternatively, by a cable 136 to the communication server 34. The cable 134 is embedded in the wall 132 of the casino premises, and alternatively, the cable 136 is routed along the lower edge of the wall 132 near the floor 138 of the casino. These cables are then connected to a signal path 140 which connects to the VPN signal line 44. For use in the Internet player station 54, the signal path 140 is appropriately connected to the Internet system 52. For a casino location, the signal path 140 can be a power distribution wire in the casino which is adapted for carrying data signals or an infra red communication link, which also carries data signals.

To support a large array of remote player stations (e.g., 46, 54) will typically require a corresponding array of processors within the communication distribution hub 34. This is due to the corresponding array of rapidly executing (e.g., at most 10 millisec/random #) RNG's, required by GCB, for each player station, as well as, the corresponding array of multimedia virtual gaming episode packets to be managed (e.g., routed), by the distribution hub 34.

It is noteworthy, that the disclosed high speed certified RNG array embedded in the communication distribution hub 34, also provides a means of transmitting and distributing a certified encrypted array of random numbers to a corresponding array of on-site or off-site player stations 46 or 54, thereby significantly reducing the required secure communication link 44 or 54 bandwidth. This functionality can also be utilized to implement local area (e.g., casino) or wide area virtual private network-based (e.g., covering an entire state) progressive gaming systems.

Another I/O port of the communication hub 34 is connected through the bus 40 to an I/O port of the player accounting server 42, which also provides player authentication, usage tracking and rating compensation functions. The accounting server 42 is, for example, a 400 MHz or better, dual or otherwise 24 hour×7 day fail-safe Pentium II personal computer with a 128 Mbyte SDRAM, 32 Mbyte display RAM, and a 144 Gbyte hard disk farm operating at a sustained 40 Mbyte/sec rate or the equivalent thereof, from IBM, Dell, Intel, Compaq, Gateway, Sony, Hitachi, HP, Motorola, Apple, Sun or others. The player eligibility authentication function ensures that the player is really who he or she claims to be. The tracking function non-intrusively determines a player's gaming habits and intercepts the actual utilization of the various gaming facilities by each player. That information is then used to appropriately "rate and compensate" a player with promotional and other bonus offers, such as travel/hotel/food/entertainment reimbursements. The compensation and promotion budget for each of the five major properties in Las Vegas, for example, is currently a significantly large dollar amount (e.g., $100M per year).

Although only three dissimilar types of games are illustrated in FIG. 1, the gaming choices for the remote players 12 or 112, include a large number of card games such as, for example, Blackjack, Stud Poker, Baccarat, and other games such as Roulette, Craps, Keno, slots and other newly deployed slot type games such as Monopoly. The present invention also allows a remote virtual slot players to participate in the outcome of a particular lucky slot machine, which is being played by a live slot player.

The terms "game" and "gaming," as used herein, include not only actual casino games with live players but also all types of electronic, electromechanical or mechanical gambling and casino game facsimiles (as defined in 15 U.S.C. 11719(a) (2) or (3)). These include games such as Faro, Monte, Roulette, Keno, Bingo, Fan-tan, Twenty-One, Blackjack, Seven-and-a-Half, Big Injun, Klondike, Craps, Poker, Chuck-a-Luck, Chinese Chuck-a-Luck (Dai Shu), Wheel of Fortune, Chemin de Fir, Baccarat, Pai Gow, Beat the Banker, Panguingui, slot machines, video Poker machines, etc.; games of skill and/or strategy such as Chess, Checkers, Backgammon, board games such as Monopoly and Scrabble, card games such as Pinochle, Hearts, Spades; video-based games such as Doom, Riven, Pong, Pac Man, Myst; video games based on sports such as golf, baseball, football, basketball, soccer, rugby; arcade type games; non-house stake and parimutual games between two or more players; and games defined by IGRA (Indian Gaming Regulatory Act) as Class II games.

For the pre-recorded mode of play, the communication hub/switcher 34 autonomously provides legally randomized video playback which precludes card counting based wagering strategies, as detailed for example in the book "Beat the Dealer" by Thorp. Recordings of actual games are obtained, for example, from previously recorded casino security tapes, or from closed tournaments, such as invitation-only high-stakes poker tournaments for professional gamers or celebrities.

It is noted that governmental bodies such as the Nevada (NV) Gaming Control Board (GCB) currently have surveillance requirements which require the deployment of at least one video camera at every ongoing licensed casino game. In addition, the video cameras that are monitored by lightly manned surveillance facilities are also backed up by continuous video recordings (e.g., VHS video tape) and by security personnel on the casino floor. The present invention enables the casino security and surveillance functions in the surveillance control center server 26 to be cost-shared with the remote gaming system 10 via communication buses 24 and 33.

The disclosed remote gaming system will typically have video quality which is an improvement over that currently used to meet a casino's regulatory security and surveillance requirements. As a result, improvement in the quality of a casino's camera surveillance system can be cost-justified by sharing the increased resolution and superior video data quality required of a remote virtual gaming system, to ensure remote player appeal. For surveillance purposes, an entire card table is typically acquired on video tape using a single video camera. A remote virtual gaming system will typically require better video image quality or more than one video camera to be deployed at each card table to capture what is happening at each live player's station. Consequently, superior quality video data is made available for surveillance, for either on-line or off-line purposes, thereby improving the surveillance system effectiveness. Note that disputes between casinos and customers can expose casinos to unfavorable publicity and even to litigation. Many of these disputes are currently resolved, both in and out of court, using the casino's existing surveillance video tapes and disks. VHS recorders from Panasonic, RCA, Sony and others are typically used. Disk farms from IBM, Loronics and others are typically used. Casinos are typically required by GCB regulations to continually record and retain the surveillance video tapes for a period of one week, after which they may be erased and reused. This disclosure makes these video tapes a more valuable casino asset by productizing each game episode into a reusable multimedia gaming episode content. However, it is noted that due to privacy, confidentiality and security considerations, the faces and other identifying features of individual ad-hoc live players cannot typically be replayed, unless the casinos have prior authorization to do so.

Casinos often have individuals on their payroll, called shills, or house players or celebrities under contract, who play various card games such as Blackjack or other games such as Roulette and Craps to generate gaming "excitement" on the casino floor to attract visiting prospective casino players. The present invention extends this legal activity of these hired players by having one or more house gaming tables completely reserved for these skilled professional house players or for celebrities hired for this purpose. These legally-authorized games are then electronically acquired on multimedia video and electronically routed to the remote player stations, on-site or off-site via the distribution hub 34. Indeed, the live players at these house tables could be world-class card players, tournament poker players, and other professional game players. Since these house players are employed by the casinos and are not independent live players, the casinos do not lose money at these live restricted house-only tables, nor are they exposed to privacy issues. Play at these restricted tables is an “entertainment show” designed to stimulate the visiting casino player’s enthusiasm and reduce their nervousness or fear for playing at the various table and other games offered by the casino.

Moreover, the games at the live house tables can also be played in a closed “secure” casino-controlled environment, recorded and then autonomously randomly selected and routed to the remote player stations. These legally randomized recorded games can also be sequentially routed to remote player stations, provided there is no possibility of a “sting” situation in which the gaming episode encrypted multimedia video signal can be intercepted and the game outcome can be either modified or substituted for. This invention enables a licensed casino to become a video gaming content provider with content which is (almost automatically) certified by a governmental agency such as the Nevada Gaming Control Board (NGCB) at the point of creation. This multimedia video gaming content product is conceptually similar to that produced by the movie/TV entertainment industry, which produces and records video entertainment content for sale to audiences. Indeed, this disclosure further blurs the distinction between the gaming and entertainment industries.

In order to conduct a legally certified game, a governmentally licensed and regulated casino is liable and responsible for ensuring that each of their games is executed “fairly” by their house employees, such as card dealers, in a procedurally predefined manner within a published set of rules. Any changes to a certified game, such as procedural changes, look-feel changes and pay table changes, require recertification by a appropriate governmental gaming control board such as those found for example in Nevada (NV), New Jersey (NJ), Illinois (Ill.), Wisconsin (WI), Michigan (MI), Colorado (CO), Mississippi (Miss.), Louisiana (LA), and the various Native American nations.

Figure 2:
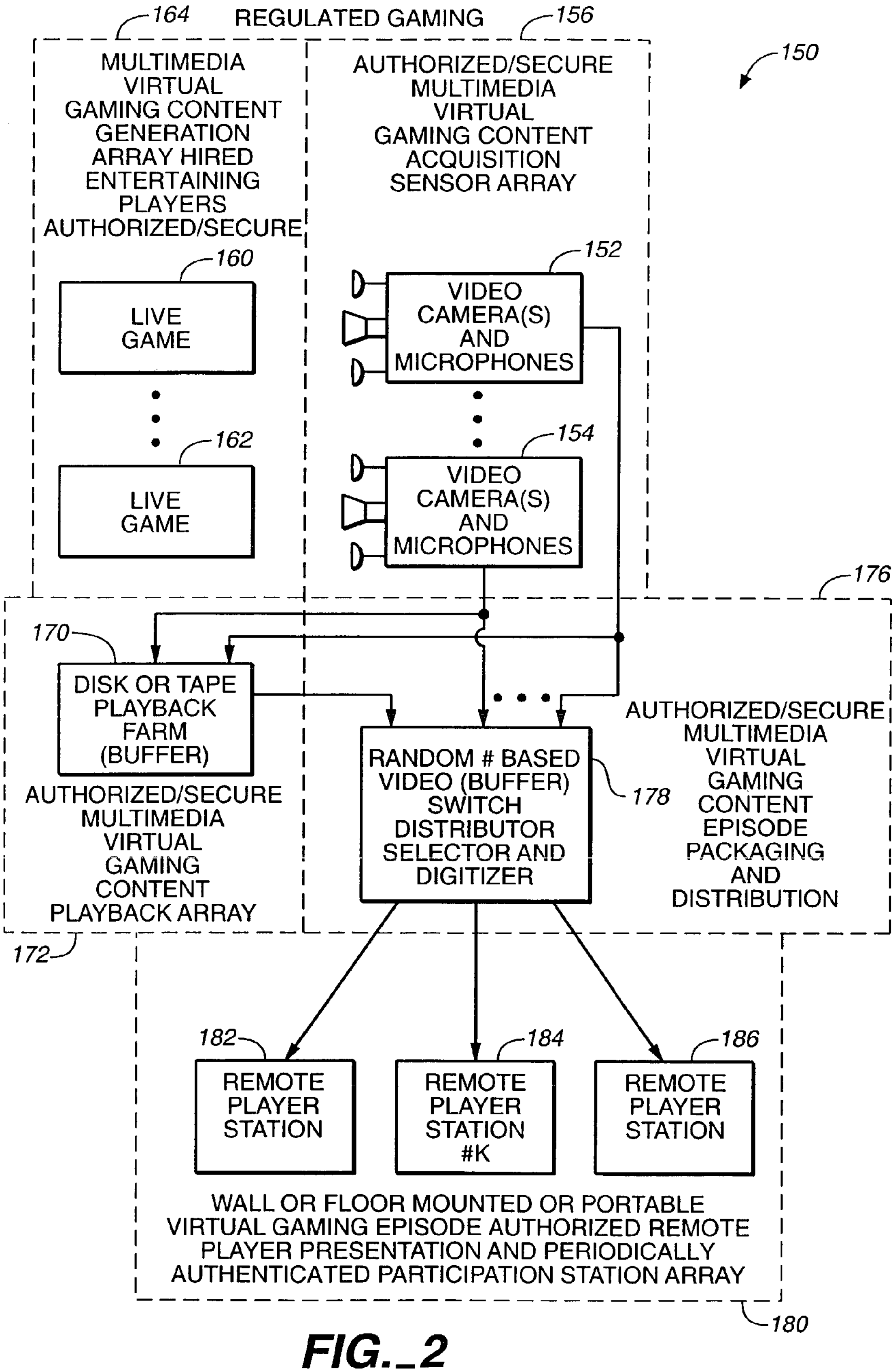
FIG. 2 is a schematic block diagram of a remote virtual gaming system according to the invention which is entirely on the premises of a casino.

FIG. 2 is a schematic block diagram of a remote gaming system 150 which is on the premises of a casino or which is otherwise monitored by the security/surveillance department of a casino. As in FIG. 1, a number of video camera systems and microphone arrangements as represented by reference characters 152, 154, are provided in a multimedia virtual gaming content acquisition array 156 to monitor various respective casino games 160, 162 in a multimedia content generator array 164. In this context, a disk or tape playback farm 170 is provided, as previously disclosed as part of a multimedia content playback array 172 to both record video signals and to subsequently randomly playback pre-recorded video signals. The output signals of the video acquisition array 156 and the playback array 172, are provided to a communication hub and switcher arrangement in a multimedia virtual gaming content episode packaging and distribution system 176 which includes a video switch/distributor/selector and digitizer 178 such as a video switch commercially provided by Maxim, Analog Devices, or Elantec. The video switch/distributor/selector and digitizer 178 includes a legally approved autonomous random number generator (RNG) for selection of one of a plurality of video sources or prestored episodes, the signals from which are transmitted to a virtual gaming episode player presentation and participation station array 180 which includes a number of remote player stations, typically shown as 182, 184, 186, through secure authorized direct connections or secure virtual private network (VPN) connections, as previously illustrated in FIG. 1.

Figure 3:
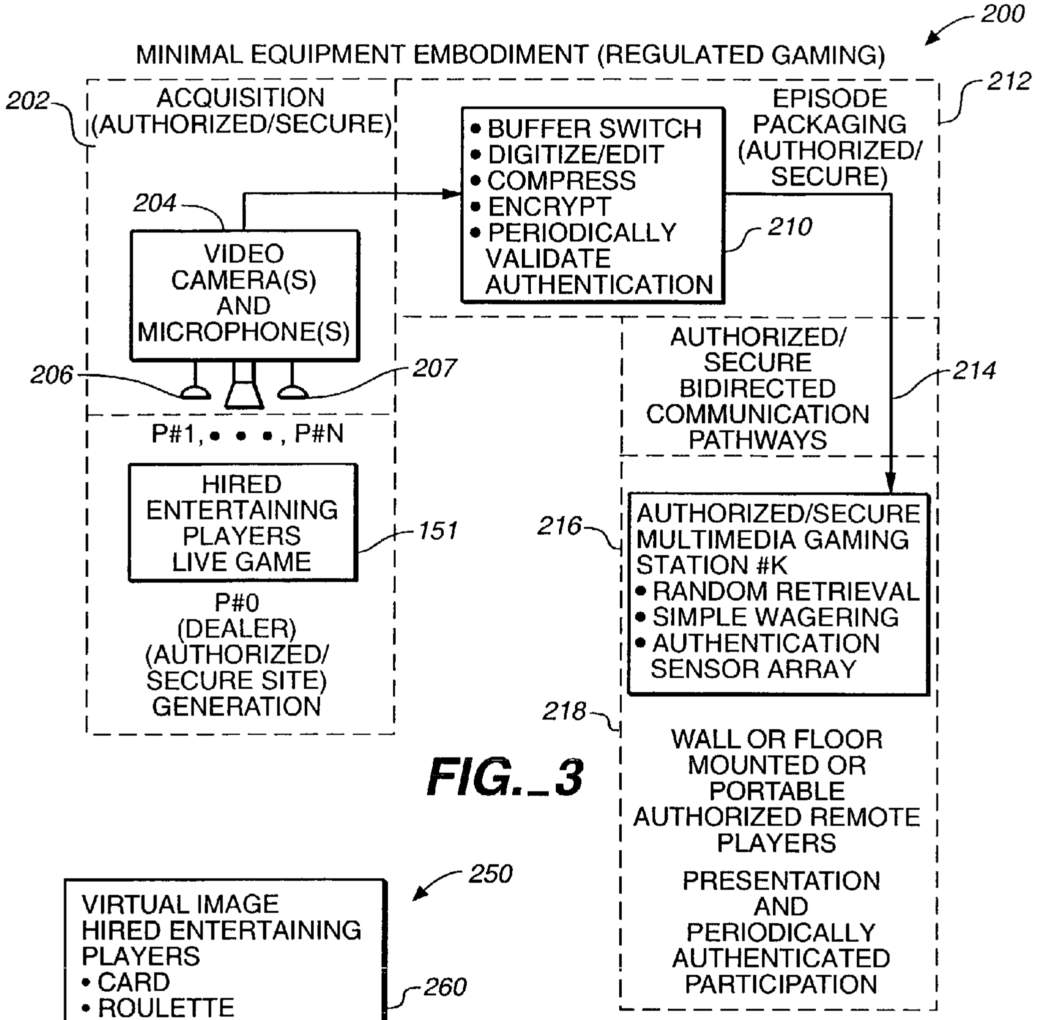
FIG. 3 is a simplified schematic block diagram of a "minimal" equipment remote virtual gaming system including data compression and encryption features.

FIG. 3 is a simplified schematic block diagram of a simplified remote gaming system 200 for use within premises controlled by a casino. An acquisition system 202 includes an analog video camera system 204 and microphones 206, 207 provide signals from a live regulated game 208 to a digitizer, compression, and encryption module 210 which, if necessary, converts the analog camera video and audio signals with a digitizer from, for example, Analog Devices or Maxim, to a digital format. Compression is done, for example, with MPEG2 standard compression chip sets provided by C3 Microsystems or Zoran or equal. Encryption is done with chip sets and firmware from RPK, or Cylink or Phillips or equal. The multimedia video and audio data are provided through a secure physical communication pathway 214, fabricated from fiber-optic or coax or power cable or wireless link, to a player terminal 216, which is part of a presentation and participation system 218, for appropriate decryption, decompression and then presentation on a display.

FIG. 3 illustrates the importance of data security in practicing the present invention. Casino management and the governmental regulatory agencies are very concerned with electronic intruders tapping into the casino communication network and manipulating any player terminal, including a slot machine, to fraudulently declare a jackpot. This type of intrusion could be done with or without collusion by casino employees. Consequently, all communication datalinks are encrypted with triple DES encryption, RSA (public key exchange) encryption, or other approved secure encryption means. Otherwise the entire system is impractical and undeployable, because it will not be approved by governmental agencies. Prior to encryption, the video data has an appropriate identification (ID) attached such as, for example, a “product source watermark” incorporating the casino/table ID, for example. A date/time and video frame ID may also be inserted to provide an additional level of tamper-proofing. As noted earlier, the video data is then compressed using, for example, J/MPEG, wavelet, or any other proprietary but GCB approved techniques. It can not be overemphasized that the Nevada Gaming Control Board (NGCB) will not license a player station which lacks an adequate level of secure communication, utilizing encryption based protection.

Figure 4:
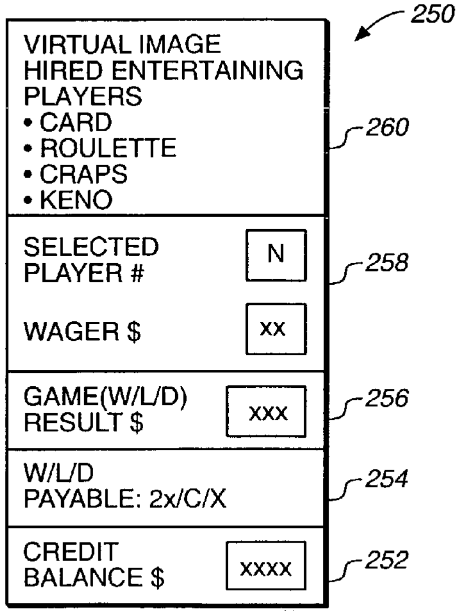
FIG. 4 is a corresponding simplified video display incorporated in a "cashless" remote player station.

FIG. 4 shows a simplified display layout 250 for a player interaction screen shown on the video monitor of player stations as shown in FIGS. 1, 2 and 3. Starting at the bottom of this Figure, a display area 252 displays the player credit balance of $XXXX. Above this is shown a display area 254 for a simple pay table 2× which means that, for every one dollar wagered, a remote player can win two dollars. Above that a screen area 256 presents the result of the game in dollars won. Above that a screen area 258 shows the actual amount wagered and the particular player number (P#) selected. When the selected game is in progress, the screen display area 260 at the top end of the player station display, displays the live or secure pre-recorded video episode image stream, preferably at the eye level of the remote player. This remote player station can be floor mounted r wall mounted or a handheld portable, subject to GCB approval. Note that wall mounted player stations are particularly attractive because of their space and cost effectiveness. Indeed video gaming stations currently deployed in casinos could also be repackaged in a wall mountable version.

Figure 6:
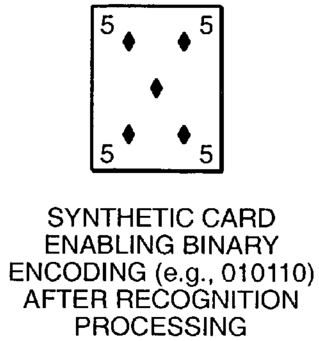
Figure 5:
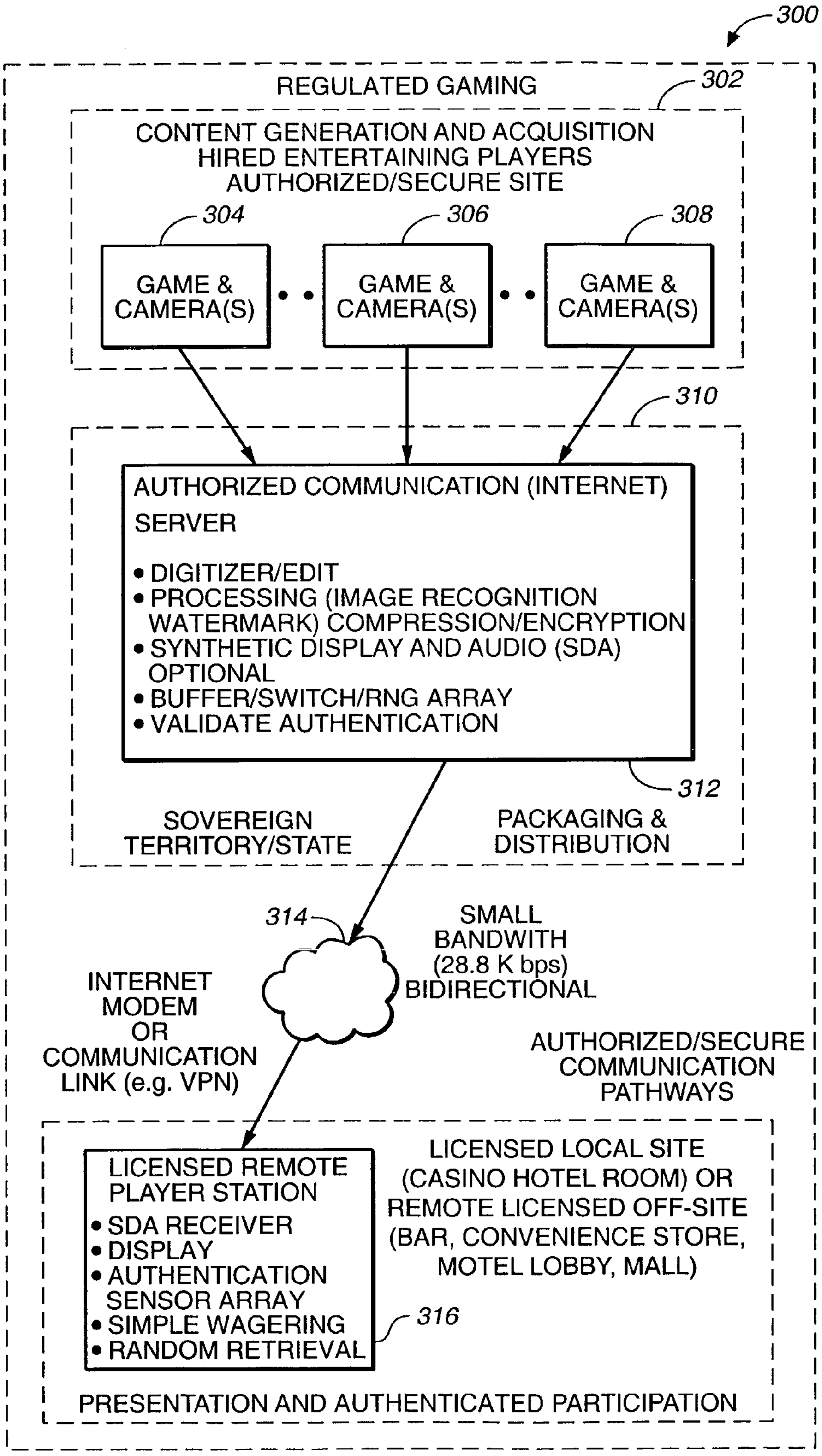
FIG. 5 is a simplified block diagram illustrating a remote virtual gaming system which uses image processing and data compression to provide images for a synthetic display and to provide an output having substantial data bandwidth reduction for sending, for example, an encoded image of a five of diamonds playing card, as illustrated in FIG. 6.

FIG. 5 illustrates a remote gaming system 300 suitable for use with player stations which are off-the-premises of the casino and therefore beyond the immediate reach of the physical security personnel of the casino. A content creation and acquisition system 302 provides multimedia video information from various game specific cameras 304, 306, 308, provided to a content distribution server array 310 which includes an authorized Internet communication server 312 within casino premises or within casino-controlled premises. The server 312 provides image processing to enhance the raw images from the video sources by creating synthetic video images using image enhancement techniques. The synthetic video images are data compressed and are transmitted at a much smaller bit rate than the incoming game related multimedia camera video signals through an authorized Internet portal 314 located in a sovereign state or Native American territory with a low speed, e.g. 28.8 Kbps, modem. Encryption is also provided for secure transmission through the authorized Internet portal 314 to a remote player station 316. The server 312 also provides an encoded display (ED) signal to display, for example, the image of a five of diamonds playing card, prestored at the remote player station as illustrated in FIG. 6. Thus, rather than transmitting the image of a “five of diamonds”, an encrypted digital word representing the “five of diamonds” is transmitted over the regulated Internet or other gaming related virtual private network. For example, the four suit of cards are encoded as hearts (11), diamonds (10), clubs (01), spades (00) in the two right most LSB’s. The thirteen cards are encoded as four higher order bits, thereby resulting in a 6 bit code (010110) providing a binary representation of “five of diamonds”. This binary code is then encrypted using DES, for example, resulting in a much larger word length that is then distributed or otherwise utilized by the disclosed secure regulated gaming system.

Thus, by using real-time image processing techniques to generate encoded video, the video data stream from each of the live games is processed in real-time to generate and remotely display the progress and outcome of each of the ongoing games. For instance, as previously mentioned, the cards played in a card game can be identified via image processing at each live player’s seat at a casino table and then transmitted to the remote off-casino site player gaming station in real-time. By encoding the current status, progress and outcome of each game (e.g., via image processing) at the live player’s gaming station in the casino, the video communication bandwidth required from the virtual private network or Internet is significantly reduced. This type of image processing can also be used to enhance the utility of the current casino video surveillance tape with a 7-day archive requirement, imposed by the GCB of various states, such as Nevada, Colorado, and New Jersey.

Figure 7:
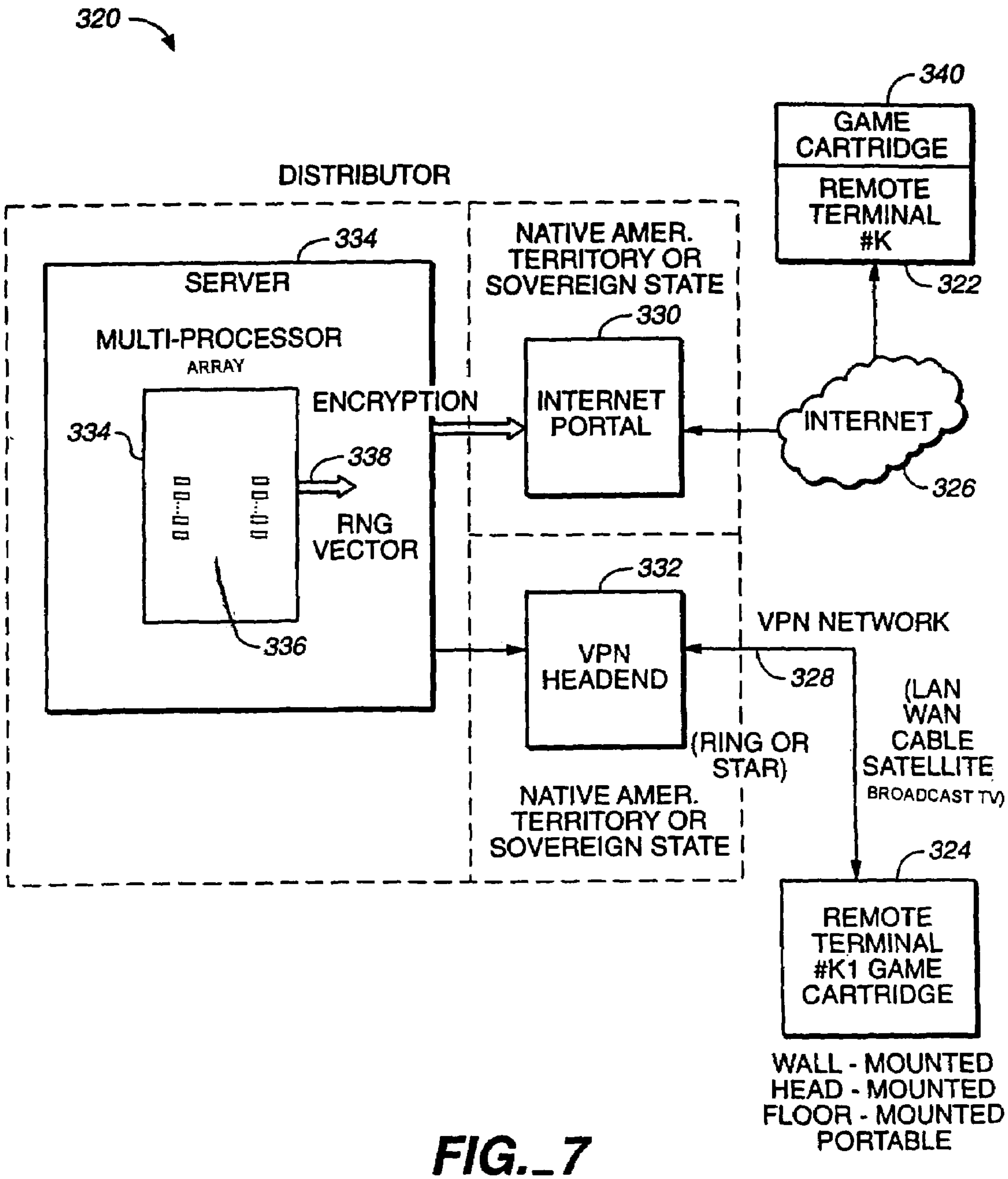
FIG. 7 is a flowchart showing a RNG array based game distribution system of the present invention.

FIG. 7 shows a RNG array based game distribution system 320. The remote terminal #K 322 or #K1 324 located on-site or off-site are connected via a secure Internet 326 or a secure virtual private network (VPN) 328. A secure Internet portal 330 and the VPN head end 332 is co-located with the high performance computing array based server 334. A multiprocessor array 336 embedded in the server 334 generates a vector of random numbers 338, that are generated using RNG’s that have been certified by the appropriate GCB. The multiprocessor array can be a multiprocessor board from Mercury Computer Systems or Sky Computer or Alacron or Analog Devices or equal. Each of remote terminals 322, 324 receives one of the encrypted random numbers and interprets it to generate the game outcome in conjunction with the particular game selected by the remote player. The available games can be built into the remote terminal player station 322, 324, or can be inserted via a cartridge 340 into the player station. This architecture is similar to conventional standalone video gaming terminals except that the RNG is located at a centralized multiprocessor based distribution server, rather than at each individual player station. The game related video does not have to be sent down from the distribution server 334, but can be locally stored and retrieved based on the specific random number received by the remote terminal player station 322, 324. However, in the Internet segment of this architecture, the selected game can also be downloaded from the server to the player station, using JAVA or equal software technology, subject to GCB approval.

A new generation of games based on receiving a multiple set of random numbers sequentially can be designed and implemented by those skilled in the art. Note that the remote player station 322, 324 cannot be readily tampered with to declare a false win, because the distribution server 334 “knows” all the random numbers that were generated. Moreover, this random number distribution architecture is very reliable and efficient and is directly adapted to wide area progressive gaming with several roving jackpots.

Figure 8:
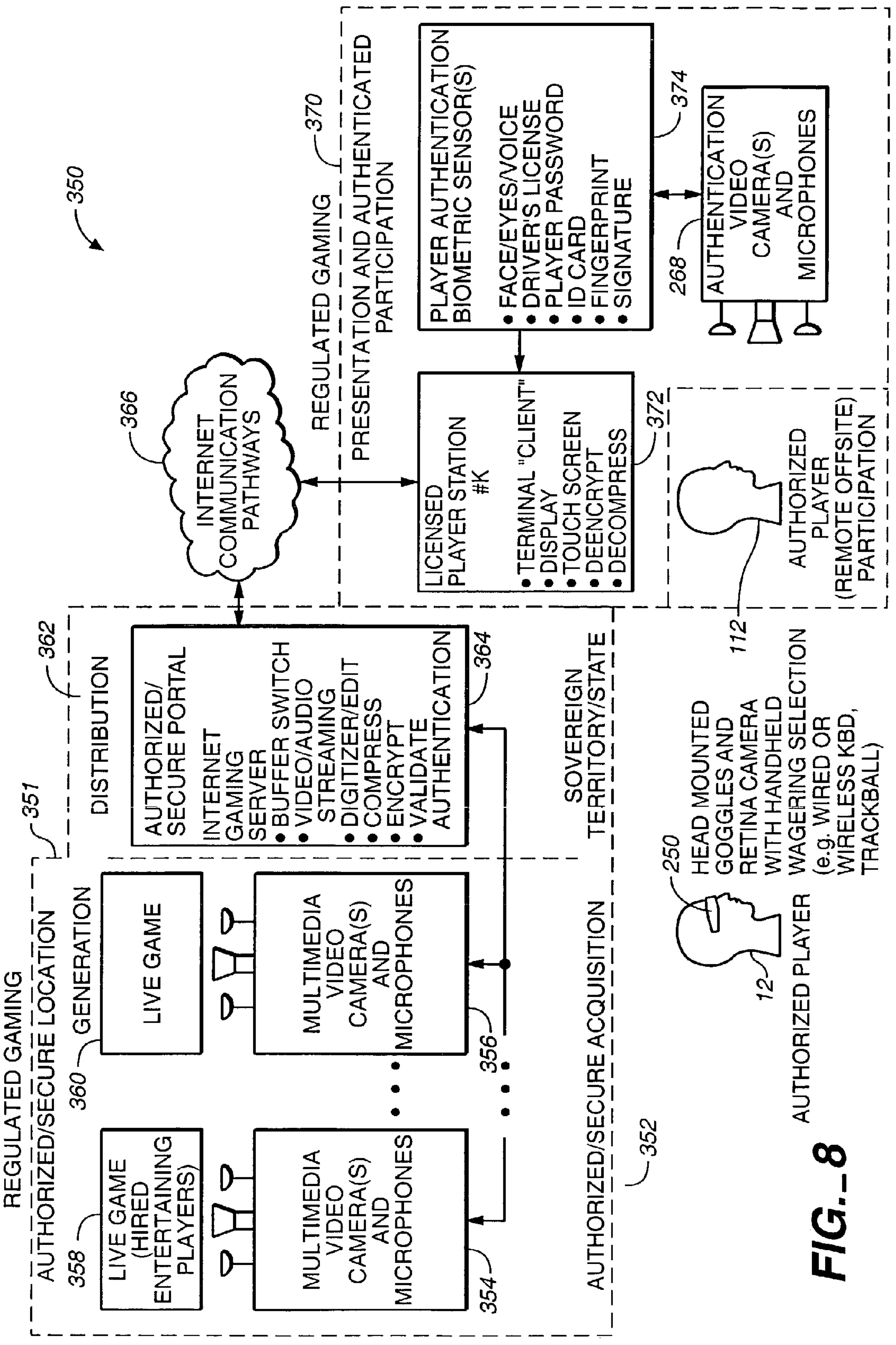
FIG. 8 is a schematic block diagram of a remote player virtual gaming system which provides remote player authentication from a remote off-site location.

FIG. 8 illustrates a remote gaming system 350 which provides player authentication from a remote player terminal site through communication links such as, for example, from a regulated Internet portal located in a territory, such as a sovereign state or Native American territory. For remote, otherwise “insecure” gaming stations outside of a casino, such as, for example, hotel/motel rooms or convenience stores, the present invention requires that the player activity at each of these remote gaming stations be continuously monitored and recorded at periodic intervals, such as every five seconds, subject to GCB concurrence, with a return path multimedia video-camera/audio channel. Other techniques such as, for example, biometric-fingerprints/retina, driver’s license pictures, and credit cards are also employed to ensure that, at all times, each individual player at a remote otherwise “insecure” site is of a legal age (e.g., over 21). Variants of the “V” chip, which are currently used in consumer TV sets from RCA, Sony and others, and which enable parents to control the access by underage individuals, can also be gainfully employed as an additional protective measure in a “layered defensive” access control implementation strategy. Additionally, the display device can be monoscopic or stereoscopic head-mounted goggles that restrict viewing to the wearer. Other restrictions that could be promulgated include prohibitions on underage individuals being within 12 feet of the player station with stiff penalties (e.g., $10 K) for violation, including imprisonment, for example, for one year. A GCB will not approve or certify any off-site remote player station without a player eligibility verification feature that is not susceptible to deception by the player and/or his cohorts. Thus the off-site room (e.g., hotel room) must be instrumented with additional cameras and other sensors (e.g., motion detection) to ensure that only eligible individuals are in the proximity of the player station in the room.

The remote gaming system 350 of FIG. 8 includes a content generation 351 and acquisition array 352 which includes a plurality of video camera systems with microphones 354, 356, which monitor a plurality of corresponding live games 358, 360. The video and audio information is fed to input terminals of a distribution server 362 which includes an authorized Internet gaming portal server 364 located in a sovereign state or Native American territory, which provides digitization, video/audio streaming, data compression, and data encryption. The gaming distribution server 364 is, for example, a 400 MHz dual redundant Pentium II with 128 MB of SDRAM, 32 MB of display RAM from Intel or Sun, or NEC or Sony or equal, a TCP/IP or other appropriate protocol stack, a video Codec from Intel, Analog Devices or equal, a compression chip set from C3 Micro, Zoran or equal, and an encryption chip set from a DES and/or a RSA licensee. Downloaded data is sent through an authorized Internet pathway 366 at, for example, a 1 MB/sec rate to a presentation and participation module 370 which includes a remote licensed player station 372. Uploaded data is sent through the authorized Internet 366 at, for example, a reduced 10 KB/sec rate back to the server 364. The player station 372 provides player information back to the server 364. The player station 372 thereby provides a game display and a player touchscreen. The player station also decrypts and decompresses data. A biometrics sensor module 374 exports face, eye, and/or voice information packet, from a video camera system 376 to the player station 372 for transmission to the gaming server 364. The player station also provides the gaming server 364 with driver's license related bar coded information using a Symboltech, or equal, 2D bar code system, a digital identity card using Drexler technology, or equal, and finger print data from Digital Privacy, or equal, for example.

Casino floor space is one of the most expensive kinds of developed real estate, ranging in price from $1000 per square foot and on up. Consequently, utilization of wall space, for example, along corridors, for player gaming stations is an important embodiment of the present invention. With GCB approval, an entire remote player station can be built into appropriate walls of a casino, for example, along corridor walls with the "attract" mode of the player station being active. Both conventional video gaming play stations and the multimedia player gaming stations according to the present invention can be implemented in a wall-mounted configuration, using flat panel displays (FPD)s from Sony, Panasonic, NEC, Hitachi, or equal. Physical layer connectivity is provided by cable either imbedded in the walls or along the lower edge of the wall at floor level. This is important from a cost perspective because it enables existing casino facilities to be economically retrofitted to accommodate a remote player station according to the present invention. Digging underground passages for cables and conduits on an existing casino floor is very disruptive and expensive. An alternative to using cables is to use secure wireless communication components from Harris, Texas Instruments, QualComm, Philips, or equal. Note that the implementation of the player station front panel as disclosed, for example, in FIG. 3 is further simplified by using "cashless" wagering with no coins or bills and using only credit cards, smart cards, or other casino-issued cash equivalent.

FIGS. 9-12 diagrammatically illustrate an example of one embodiment of several elements of a remote player interface for a remotely-located player station.

Figure 9:
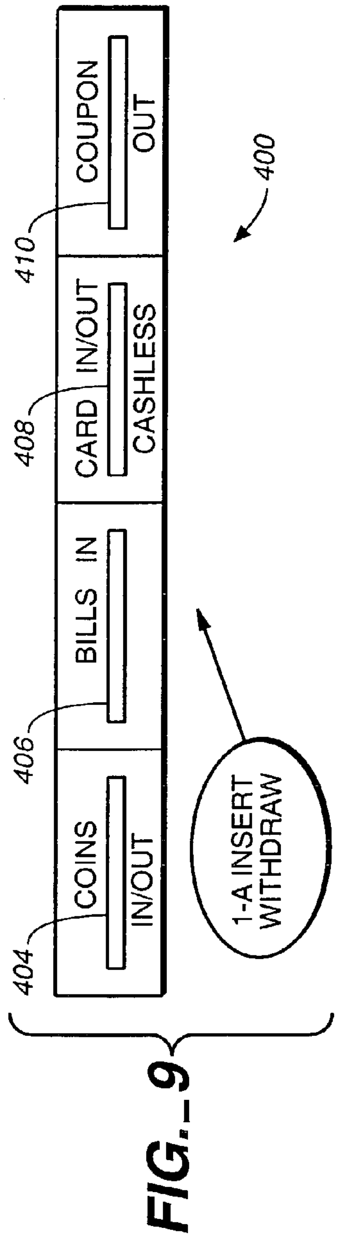
FIG. 9 illustrates an example electromechanical acceptor-validator sub-system, for use by a remote player.

FIG. 9 diagrammatically shows an electromechanical acceptor-validator subsystem 400 for a video display station. This subsystem physically handles inputting and outputting money and money equivalents to the system by a remote player. This subsystem includes, for example, four generic physical input and output ports. A coin slot 404 accepts or dispenses coins, tokens, chips, or the like. A currency slot 406 accepts currency. A card slot 408 receives cards, such as credit cards, debit cards, smart cards, or the like for debiting and crediting money to a remote player's account. Note that the player is paid back in the same currency denominations and currency type that was originally inserted into the remote player station. This currency matching procedure is necessary to comply with the federal (IRS) and state anti-laundering laws (e.g., NV Reg. 6). A coupon slot 410 is provided so that, if the payout amount is large, then the casino typically prints out a coupon that can be converted to cash at the casino cashier's cage. Note that the computer/terminal at the cashier's cage is linked to the casino hotel/VIP server and the player accounting server, which in turn is linked to the remote player stations, to ensure ease of authentication and regulatory compliance.

Figure 10:
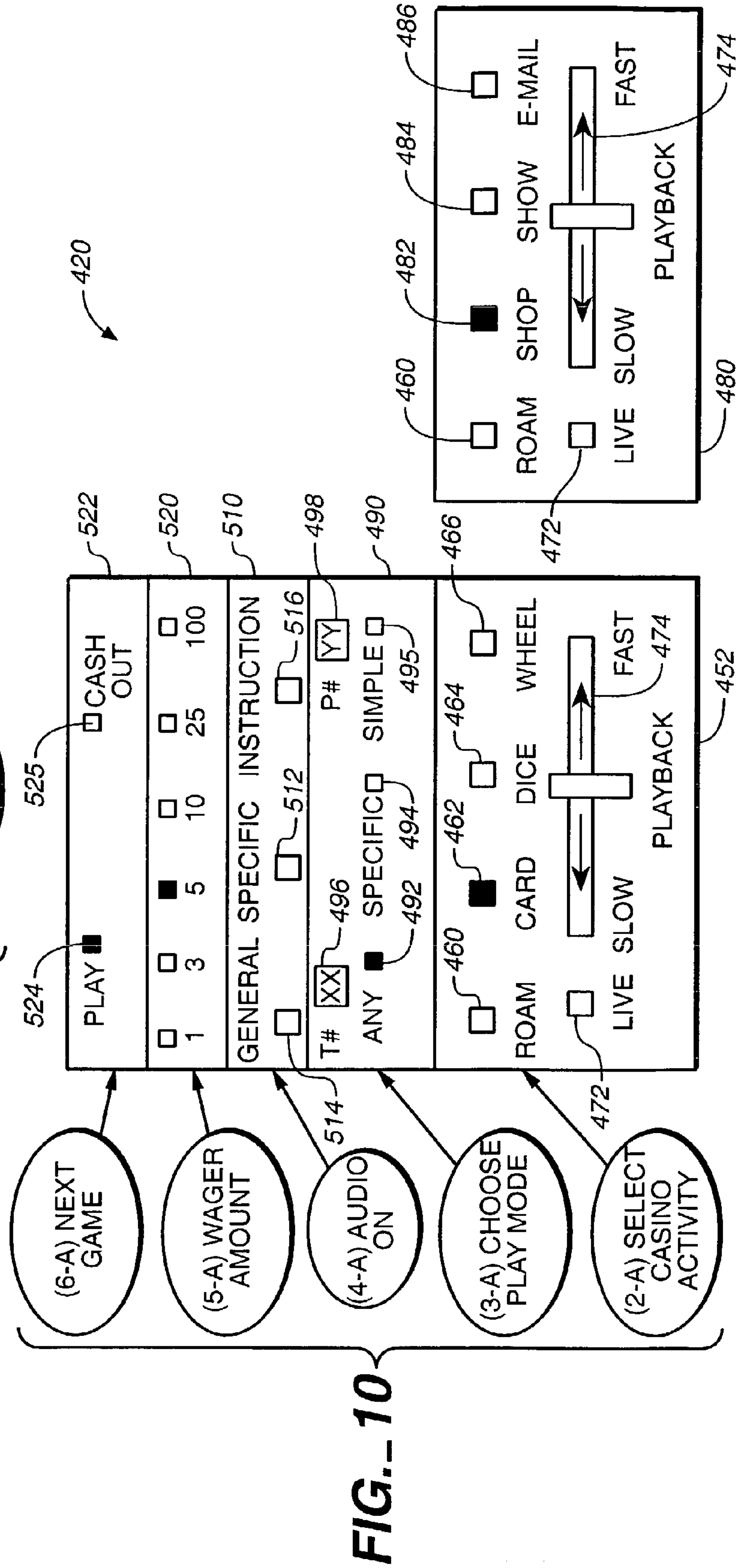
FIG. 10 illustrates a touch-sensitive area of an example video display subsystem for use by a remote player.

FIG. 10 illustrates a touch-sensitive area 420 of a video screen for a remote player station. The touch-sensitive area 420 includes a number of smaller touch-sensitive selection areas, called action buttons. As described below, action buttons are touched by a player to select certain game functions.

Figure 11:
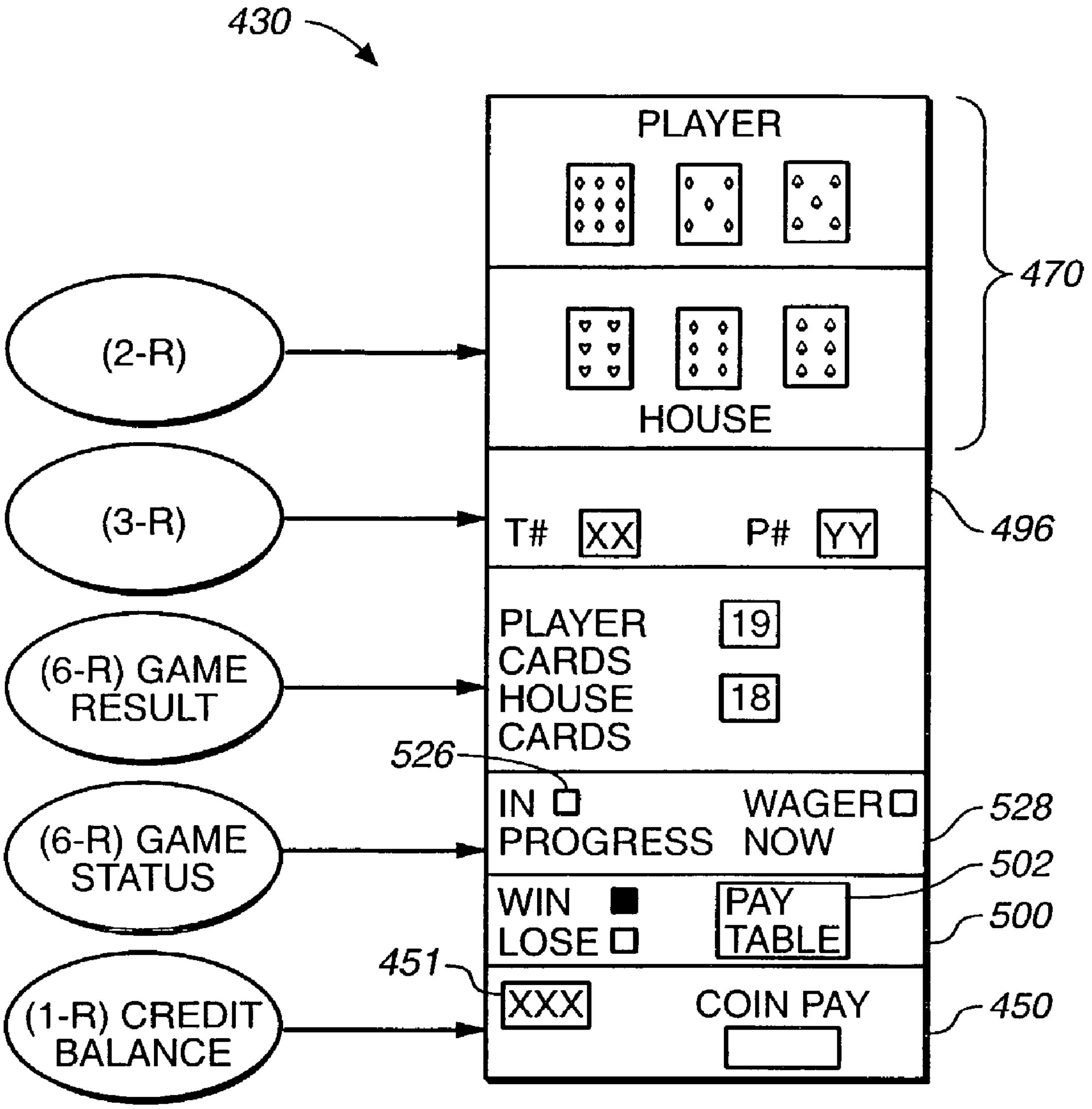
FIG. 11 illustrates an example video display presentation on a display sub-system response screen.

FIG. 11 illustrates a video presentation and response screen area 430 which displays various video responses and/or graphic presentations by the system to the action buttons. The multimedia video presentation can also be provided by using head mounted monoscopic or stereoscopic (3D) goggles, such as those available from Kaiser Aerospace, or equal, particularly if they enhance the virtual gaming experience for younger, age 21 to 35, players. Moreover, head mounted goggles restrict unauthorized access to gaming and enhance player privacy (e.g., win/loss and net credit balance is hidden from passers by. Furthermore, by incorporating a miniature camera to within the head mounted goggle assembly to acquire an image of the remote player's retina also enables the player accounting server 42 of FIG. 1 to periodically authenticate the player, as noted earlier in FIG. 8.

Figure 12:
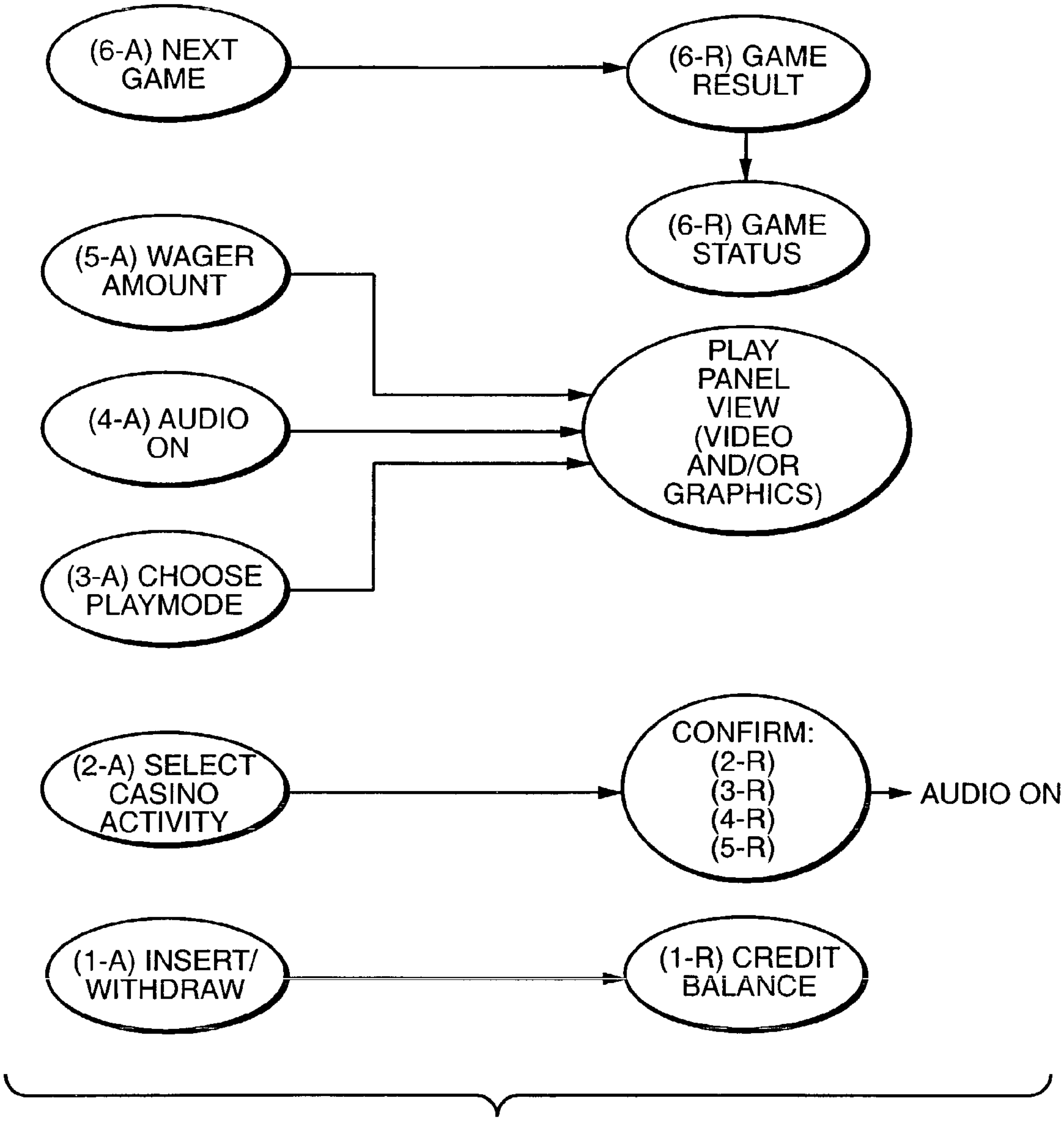
FIG. 12 illustrates a typical sequential series of player actions which produce various responses.

FIG. 12 shows a number of action-step balloons, labeled (nA) which are used to represent various sequential steps followed by a remote player in the operation of the remote player station. A remote player touches the action buttons shown in FIG. 10 to make his or her selections. FIG. 11 shows a number of response-step balloons, labeled (nR) which indicate corresponding system responses to the action-step balloons (nA), where these system responses are displayed on the video presentation and response screen area 430 of FIG. 11. This representative action (A), response (R) sequence is shown in FIG. 11 the logical design process for facilitating player friendly interaction to enable those skilled in the art to implement other possible game presentation sequences.

Referring to FIGS. 9, 10, 11, 12, a typical play sequence is described, as follows:

First, in activity step 1A, the remote video player initially inserts money, in an acceptable form, such as coins, bills, or credit card, or smart card, or "cashless" player tracking card, into one of the respective slots 404-410 in the electromechanical acceptor-validator subsystem 400 of FIG. 9 to establish the remote video player's creditworthiness and age eligibility, that is, over age 21, based on his possession of the appropriate data on a legally issued card. Note that this does not preclude insertion of stolen or otherwise unauthorized cards by a dishonest player. In the corresponding response step 1R, the system responds by having a presentation and response screen area 450 display the remote video player's current credit balance in a credit balance area 451.

Second, in activity step 2A, a remote player touches one of the action buttons in another touch-sensitive subarea 452 of the video screen. These action buttons include, for example, a roam button 460, a card game button 462, a dice button 464, a roulette wheel button 466, or a button for any other game offered by a licensed gaming property. In response step 2R, the presentation screen responds, for example, with an appropriate live or pre-recorded multimedia video episode package in a response screen area 470. When the roam action button 460 is selected, the remote video player gets a video tour of the entire casino property. A specific gaming area is selected by touching the respective card, dice, or wheel buttons 460-466 in step 2A concurrently. Below the roam button 460, the live button 472 enables the remote player to view the ongoing live game type selected. Otherwise, a playback speed control mode is active and the playback viewing rate can be accelerated or de-accelerated, as selected by the remote player with a playback speed slider 474. By de-accelerating the presentation rate of the "playback" mode, the remote player can reduce the level of stress. Note that casinos expect their card dealers to average about 50 card games per hour; this can be very stressful, particularly for a novice player sitting down at a live casino table.

Non-gaming related selections shown in the alternative screen area 480 in FIG. 10 are activated by double-clicking the roam button 460. Optionally, this casino specific tour includes various shops and entertainment shows available. Product and service purchases and show reservations can be made and personal messages such as e-mail and voice-mail can be received and sent, using the touch screen display, if desired, by selecting E-commerce related buttons 482, 484, and 486, respectively. As noted above, these choices are visible only after double-clicking the roam button 460 of FIG. 10. A corresponding roam video stream is presented in a response screen area 470 of FIG. 11. Specific choices associated with E-commerce shopping, entertainment shows, and interactive messaging including even stock/commodity trading are casino property management dependent and can be appropriately implemented subject to GCB concurrence. Double-clicking the roam button 460 also causes the card button 462, the dice button 464, and the roulette-wheel button 466 to be no longer visible and therefore not selectable on the touch screen. Below the roam button 460, the live button 472 enables the remote player to view the ongoing live non-gaming activities offered by the casino property (e.g., trailer of available shows). The rate at which this multimedia video is displayed in the response screen 470 of FIG. 11, can be controlled by the player, by adjusting the playback speed control slider 474, provided the live button 472 has not been previously selected.

The primary purpose of "roaming" is to enable the remote video player to decide what specific table number (T#) and player number (P#), either live or pre-recorded, to wager on, either for or against, the selected player. Typically, the identity of the live or pre-recorded player is not disclosed, visually or otherwise, because of privacy issues. However, the identity of the live or pre-recorded player may be disclosed, if the selected table/game is a game sponsored by the casino using casino employees, professional gaming invitees, or celebrities such as, for example, the cast members from the movie "Casino" or "Rounders", depicting poker players. As a result of this roaming mode, a remote video player can choose to participate in one or more ongoing or pre-recorded, regulated gaming activities such as cards, dice/craps, roulette wheel, etc. Any new games introduced by the casino can also be seamlessly integrated into this disclosed system, by installing a multimedia video content acquisition sensor array to monitor any new live game.

Third, in activity step 3A, the remote video player touches one of the action buttons in a touch-sensitive subarea 490 of the video screen. The action buttons in this area include an "any" action button 492 or a "specific" action button 494. The "any" action choice is simpler and directs the system to use certified random number generators (RNG) to randomly select an ongoing live or pre-recorded game in an autonomous manner and to present that game on the response screen area 370 of the player station and to present the table (T#)/player (P#) in a response screen area 496. Moreover, a "simple" set-up button 495 is also available, as a part of the above-mentioned "third" group (i.e., 3A) of actions, thereby "setting up" all the subsequent choices for the novice player. For instance, the wager amount could be automatically set to the smallest allowable amount (e.g., $1.00), the lowest risk player would be selected (i.e., player #0), etc., as per 498 and 520 in FIG. 10.

The selection of the "specific" action button 494 requires the remote video player to also input a specific table (T#)/player (P#). The player first selects T# by repeatedly pushing a T# touch button 496 that causes the T# to be automatically indexed upwards, until the player stops at XX. Then the player selects the P# by repeatedly pushing a P# touch button 498 that causes the P# to be automatically indexed upwards, until the player stops at YY. Note that player #0 is the house/dealer. A response screen area 500 now displays a pay table 502, which shows what the remote video player will receive, if the live player (P) # on whom the wager is placed wins. Typically, wagering with the house (i.e., player #0), results in a significantly smaller win payback, for example 10%, whereas a win against the house, by any other player, is typically "double your money back" or 100%. The pay table 502 on the screen informs the remote video player, in advance, what can be gained or lost, if a wager were to be made by him in a timely manner.

The NV GCB considers each "distinct" set of "wagering rules" with a corresponding "pay table" as a "distinct" game that must be separately "certified". Thus, even when one of the rules is changed with a corresponding pay table change, recertification is required. The following details the significantly simplified wagering rules for currently deployed casino floor games that are played remotely, as per the present invention. Each variation is considered to be a separate game with a good example of variants being the numerous video poker variants. The disclosed novel wagering concept enables any current or future game that requires one or more "live players" (LP), to be included in this novel gaming paradigm. All current or future games, by definition, entail at least one live player in a regulated casino environment. Therefore, this disclosure also includes these future games or other games not mentioned herein, because of the broad applicability of the disclosed simple but novel "for or against" wagering concept.

In all cases, remote player station touch screens are implemented to enable a remote player to make wagers and decisions in a relatively stress-free and timely manner, as compared to the stress experienced by the live player at a table in the casino. As noted earlier, casinos train and expect the card dealer to deal about 50 games per hour in a procedurally correct manner, otherwise the "productivity" of the dealer comes under the close scrutiny of the casino floor supervisor.

One important aspect of this invention is that it enables the "remote player" (RP) to place a wager on a "live player" (LP), thereby making the wagering decision simple, just like placing a wager, without serious thinking, in favor of one of two opposing teams or a particular horse in a horse race. Even a "one horse race with a time deadline" can be accommodated within this paradigm, and so can live slot gaming. Live player based wagering can be done for any card table game such as, for example, Blackjack, Multi-Action 21, Mini/Baccarat, Pai Gow, Caribbean Stud, 7 Card Stud, and Texas Hold'em. Simple "for or against" wagering can also be done on Craps, Roulette, and Slots. Those skilled in the art can also devise more complicated wagering schemes and the corresponding pay table odds, subject to player appeal and excitement generated.

The remote player (RP) doesn't need to know the specific rules of the selected game that he wishes to virtually participate in. The remote player only needs to be lucky and/or smart enough to pick a live player on a winning streak. This wagering paradigm only requires "matching up" with or "wagering on" a specific live player. A simple pay table is 2×, if the selected live player wins. If a remote player is diligent enough to learn the specific rules and play attentively, then the remote virtual player might as well play at the live gaming table, like a typical live player does. Note that by playing a virtual game at a remote player station that can also be slowed down using slider 474, the novice player can reduce his anxiety of playing at a live table with others watching; this is the underlying instructional facet of this disclosure.

Other simple wagering variants that do not always require "matching up" with a specific live player are disclosed in the following examples of simplified games which are variants of conventional casino games; the card game specific remote player input screens as in FIG. 10 must be appropriately designed, by those skilled in the art to accommodate these are other games not mentioned or detailed herein:

Craps/Dice: DICE-MATCH (TM) or EASY-DICE (TM)—simply "match" the dice #: (A) Match totals: call 2 or 12, pay 30×; call 3 or 11, pay 15×; call 4 or 12, pay 10×; call 5 or 9, pay 6×; call 6 or 8, pay 4×; call 7 pay 3×, (B) Match BOTH dice: call "specific same" (e.g., 1&1, . . . , 6&6), pay 30×; call "specific different" (e.g., 4 & 6, 3& 5), pay 15×, (C) call "same", pay 3×; call "different", payback 1.1× (i.e., net gain 10%).

Roulette: BALL-MATCH (TM) or COOL-ROLL (TM)—simply "match" the ball location (e.g., #, or color, or odd #, or even #), pay winner as per usual Roulette pay table. Note that the remote player (RP) is discouraged from placing multiple/complicated wagers that a live player (LP) can place.

Card games: CARD-MATCH (TM)—simply "match" the "live player (i.e, LP #0":dealer) or associated card totals; (A) BJ/21—BLACK-WHAMMY (TM) or EASY-JACK (TM), (B) mini-Baccarat, (C) Caribbean Stud, and (D) LET-IT-ROLL (TM). When wagering "for or against" the pay table is 1.1×, if the live player #0 wins; note that all pay tables are subject to both casino and GCB concurrence.

Slots: SLOT-MATCH (TM)—simply "match-up" with a particular live slot player on a winning streak, as per card games above. This game could have been included as a part of card games, as disclosed above, but has been separated out to emphasize its novelty. The remote player (RP) can concurrently wager on multiple (e.g., 3) live players (LP), who could be celebrities, for example, on slot machines at various locations on the casino floor. The remote station pay table can mimic that which is presented to the live player (LP), subject to casino and GCB concurrence. Note that the remote gaming station disclosed herein also supersedes the currently-deployed single and multiple game video slot gaming station in all the licensed gaming establishments including casinos, because all the functions in a video slot gaming station including multiple games, can also be implemented on the disclosed remote virtual gaming player station.

All the regulated games offered by the casino, including those noted above, can be augmented by the disclosed simple betting rules: "for or against", thereby also enabling other relatively novice players to participate in a live actual game, without all the attendant stress and embarrassment of actually sitting down at a casino table and making numerous real-time decisions. To enable this participation at an actual table, appropriate means can be provided to enable this "second tier" of remote players to: (a) view the ongoing game using mirrors or cameras and monitors, for example, from a seat overlooking the actual live table on the casino floor, (b) collect their wagers prior to the start of the game, and (c) give them their appropriate payout at the end of the game. Note that casino player tracking or other cashless cards can be very useful in making this an efficient process in a live casino floor environment. This disclosed "second tier" gaming participation is particularly attractive to relatively novice players when the actual table has players who are either professional gamers or celebrities.

This disclosed virtual gaming system provides that each and every regulated casino game that is transacted on the live casino floor can be recorded and subsequently distributed, or immediately distributed, after appropriate compression and encryption, thereby automatically creating copyrightable video content, similar to an episode or scene in a video movie product. Currently, all casinos in states such as NV, CO, NJ, Miss., continuously record and retain gaming video material for a week to comply with surveillance regulations. The present invention provides for the reusability, repurposing, and branding of such casino generated video content. This invention provides casino games with very simple wagering rules and provides various regulatory and anti-cheating/theft measures such as encryption and watermarking. Practical distribution is facilitated using data compression. The quality of the virtual video is superior because, for example, a color image resolution of 640×480 pixels or better is used and the casino can also provide a 3-D perspective view of a game by utilizing multiple cameras, if required, for enhanced remote player appeal.

Moreover, a "bonus jackpot" such as, for example, cash, or consumer product (such as, for example, appliances, autos, and homes) can be displayed in this screen area 470, thereby creating additional player excitement. This bonus jackpot can move randomly, using a certified server-based RNG, amongst the various player stations on the casino floor and also include the regulated off-site locations, such as a licensed bar or other licensed route locations. Note that the remote video player does not have to have the skill level required to maintain a winning streak, such as that required, for example, in Poker. Nor does the remote player even need to understand the rules of the game. In this system, the remote video player's skill or luck occurs in selecting the specific live or pre-recorded player.

Fourth, in activity step 4A, audio is selected in the touch-sensitive subarea 510 of the video screen. Specific audio is obtained from a specific table number (T#) using a specific action button 512. General audio is a conventional casino soundtrack, unrelated to a selected game and selected with the touch-sensitive subarea 514 of the video screen. The present invention also enables novice players to be instructed on how to play new or existing games in a relatively stress-free environment, using expert players. This virtual playing mode is more interesting than watching the currently-available instructional video tapes. The remote player stations could be put into an "instructional" mode for an hourly fee, if desired. This mode is selected using button 516 in FIG. 10, which provides the play panel video for the selected table game, an instructional audio track, and superimposed video captioning.

Fifth, in activity step 5A, a selection is made in the touch-sensitive subarea 520 of one of a number of action buttons indicating the dollar amount of a wager. This amount is consistent with the remote video player's available credit 451 and with the house wagering limits. The portion 430 of the video screen continues to show the gaming action for the selections made. In particular, the player can see whether a game is: (a) in progress 526 and no wagers can be accepted, (b) the outcome 500 of the last game: "win-or-lose" and the corresponding pay table 502, if the remote player had placed a wager, or (c) a flashing "wager now" message 528, letting the remote player know that wagers are still being accepted, prior to the start of the next virtual game.

The remote player can bet, either "for or against", the live or pre-recorded player. As a result, the skill level of the remote video player is comparable to that required of a conventional slot machine player and can be considered to be a "no-brainer". There is no unique game related decision making learning curve, anxiety, time or peer pressure associated with any game, old or new. The pay table 502 for winning a game is as per the casino published pay table, as pre-approved by GCB. One possible pay table, for this simple wagering disclosed herein, is to double the player's bet—if the selected live player wins, that is, for a $10 bet, $20 is paid. However, if the player bets that the house-dealer (i.e., player #0) will win, then the player's payback is only "110% of the bet", that is, for a $10 bet, $11 paid if the dealer wins. A remote licensed multimedia secure player station with a such as a simple pay table and wagering decision is an important aspect of the present invention.

More complex wagering schemes are also supported by the presentation screen although these extend the simple wagering concept advanced by the present invention. More sophisticated and professional gamblers may choose to play with the usual complex wagering and playing rules, which can be activated by pushing an additional "Complex" button during the above-mentioned "second" group of remote video player actions. However, the presentation screen for each game becomes as complex as the usual live casino games. Moreover, this "complex wagering" button disclosure still contributes several novel concepts including (a) game pre-recording/branding, (b) secure game distribution, (c) random game presentation (e.g., prevents card counting and team play, which is discouraged by NV casinos).

Sixth, in activity step 6A, a remote video player signals that he or she wishes to play in the next regulated virtual game by activating the play action button 524 in the touch-sensitive subarea 522. Subsequently, the remote video player only pushes the play action button 524 in a timely manner before the in-progress light 526 in a viewing area 528 comes on. The credit balance 451 in the response screen area 450 is automatically updated at the end of each game to display the remote video player's current credit balance.

A remote video player can stop playing and can leave the remote player station at any time by pushing a cash out action button 525 in the touch-sensitive subarea 522. The player is paid back in the same denomination and currency type that was originally inserted into the player station, to comply with the federal and state anti-laundering money laws. If the payout amount is large, then the casino can print out a coupon at the player station that can be converted to cash at the cashier's cage.

The off-site remote player station is packaged at the same security level or better than a business safe or a bank ATM machine and includes an audible alarm to make it significantly tamperproof and to satisfy the certification requirements of government gaming agencies. The touch screen is spill and shatter proof. Note that remote video player stations which are on the premises of the casino are closely monitored by casino security personnel as required by the GCB, unlike the off-site remote video player stations, which therefore need additional protection measures to be incorporated, as disclosed herein.

Slot jackpot winners typically have the opportunity to win a bonus jackpot such as a car, a vacation, and other products. The remote video player stations can also display in screen area 470 of FIG. 11, a roaming bonus jackpot that moves from station to station to thereby serve as an advertising banner similar to those typically displayed on the Internet. Since all the player stations are controlled by the gaming content distribution/communication hub (34), the jackpot can also be a progressive jackpot, either within a casino or amongst several casinos, via a virtual private network (VPN), subject to GCB approval.

FIG. 12 shows the baseline player actions and the corresponding player station responses in a logical sequence for one embodiment of a player station graphical player interface (GPI) as illustrated in FIGS. 9, 10, 11 and 12. Those skilled in the art can devise other player-friendly interaction schemes based on any other logical "action-response" sequence that may be preferred, because of the nature of the regulated virtual games being offered or the skill level and demographics of the anticipated players. For instance, another button can be added to enable the virtual player to accelerate or slow down the time per game in the prestored mode of play. Those skilled in the art realize that cluttering up the player station with too many choices and displays will only serve to discourage the "novice" virtual player from playing.

Figure 13:
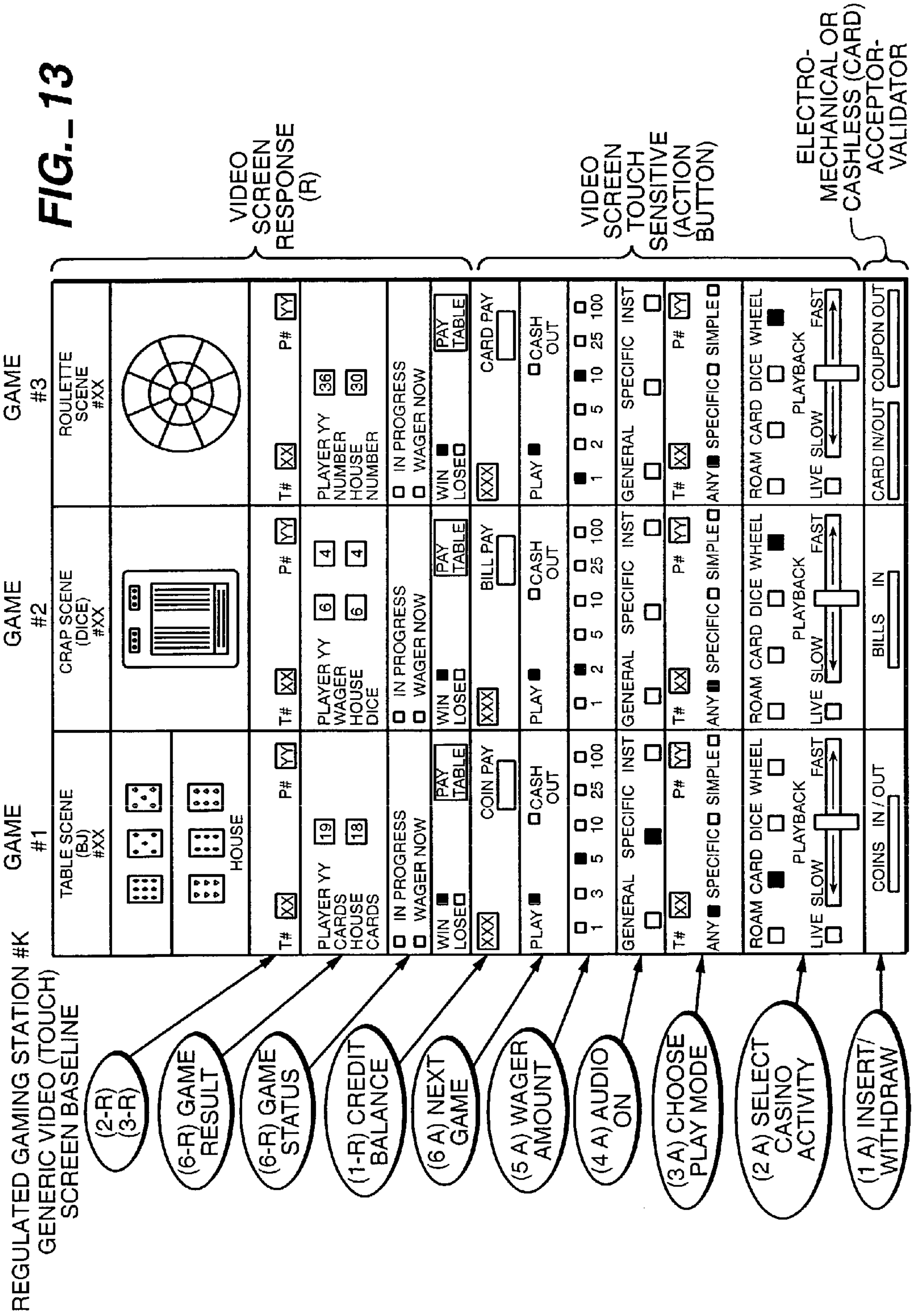
FIG. 13 is a view of a player interface for a remotely-located player station showing on one screen three simultaneous dissimilar gaming response display panels and three corresponding player-friendly, touch-sensitive display screen areas.

FIG. 13 illustrates three concurrent games in the upper portion of the video response area, as might be played by an intermediate level gambler. The action and response steps are similar to those illustrated in FIGS. 9, 10, 11 and 12 for only one game. The juxtapositioning of these apparently dissimilar games, illustrates the disclosed wagering similarity between these three different games, as provided on a remote player station. Displaying the games in this manner is intended to facilitate adjustment of a player's mental frame of reference and learning curve to that of a typical relaxed slot player. A remote video player makes selections using the action buttons on the touch-sensitive screen. The system responds such that the presentation and response screen area provides a video response. A typical remote video player operates an action button on the video display console with an activity step (nA) that produces a corresponding response (nR). As illustrated in the left side of FIG. 13, an activity step (nA) produces a corresponding response step (nR).

FIG. 13 illustrates a Black Jack (BJ) game, a crap dice game, and a roulette game.

FIG. 13 illustrates an important feature of the present invention, which is that a remote virtual video player, particularly a younger one, at an intermediate skill level, can concurrently play several dissimilar games on the same gaming station; variants of this feature could be referred to as "game within a game."This type of multiple concurrent gaming is enabled by the disclosed simplicity of the wagering rules. The remote video player can virtually roam around a casino and participate in a plurality of games that are just beginning, without leaving his remote gaming station seat. The player can also purchase products and entertainment shows, while in the roaming mode, without leaving his seat.

Figure 14A:
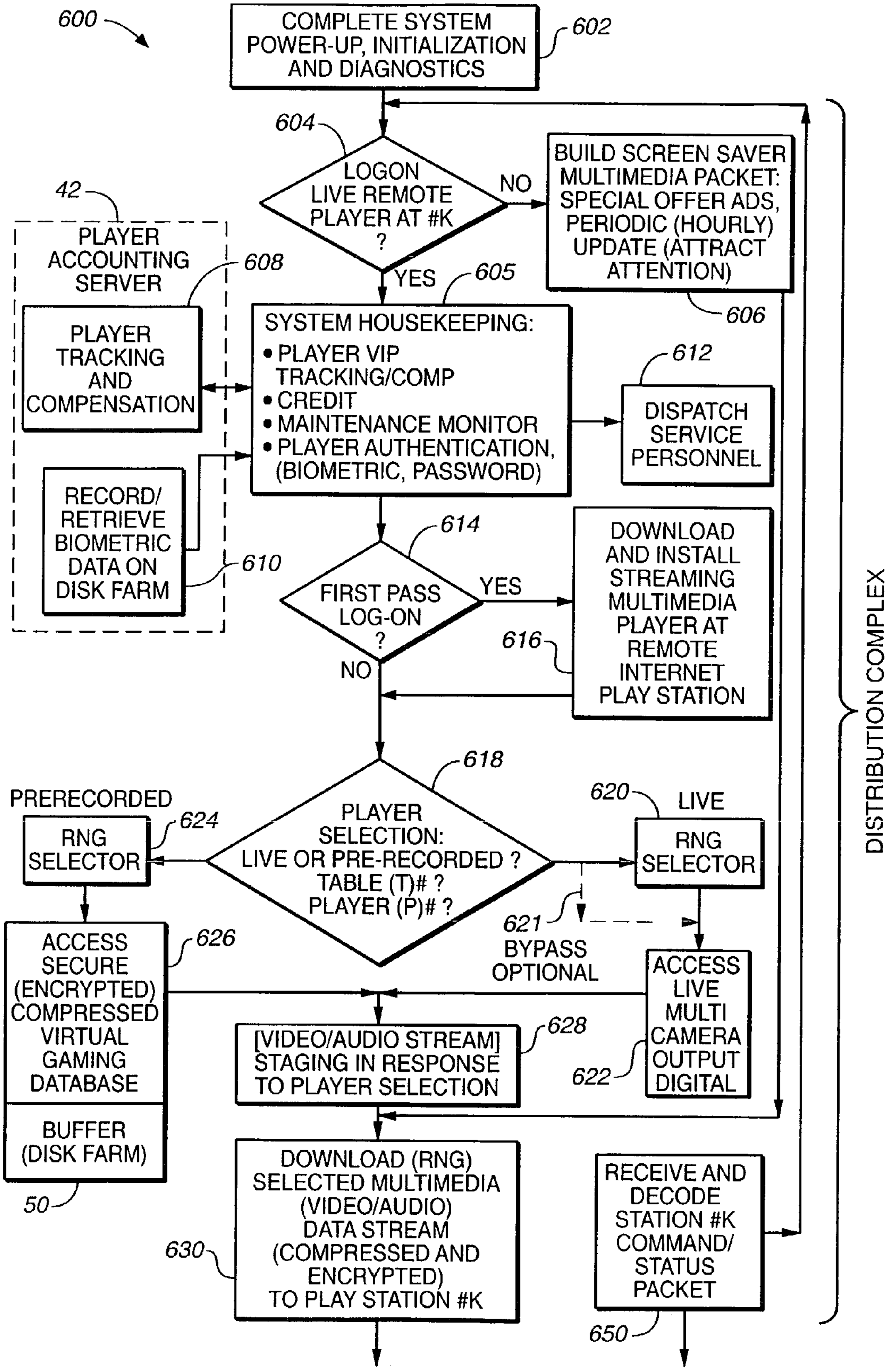
FIG. 14 is a data and control flowchart illustrating operation of a remote gaming system according to the invention.
Figure 14B:
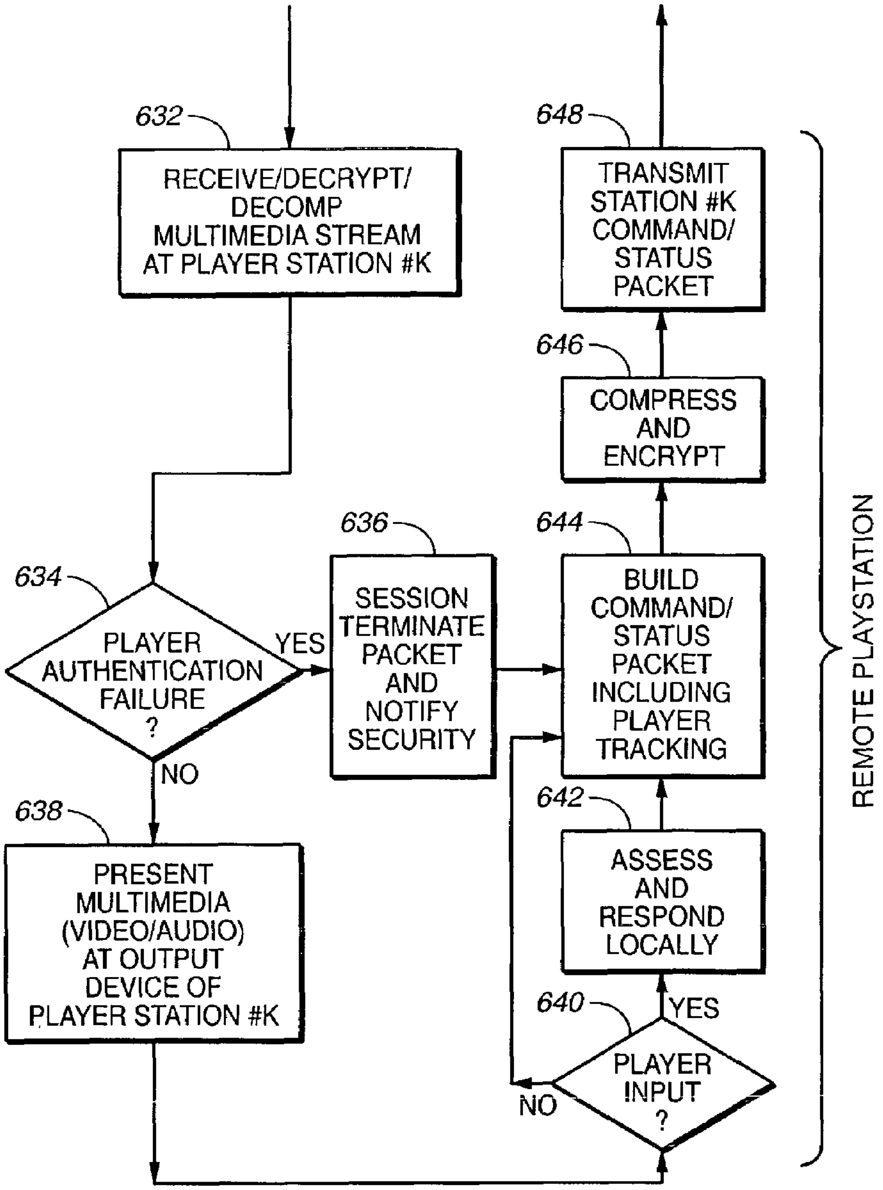
Figure 14:
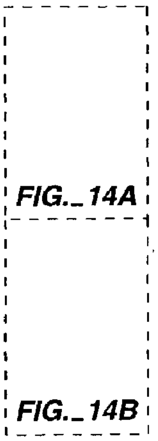

FIG. 14 is a flowchart 600 illustrating operation of a simplified wagering-based remote gaming system according to the invention. This flowchart shows acquisition of multimedia content for a regulated casino game. The subsequent distribution and presentation processes are also shown. The upper portion of FIG. 14 shows electronic processing within a governmentally licensed and regulated casino virtual gaming control center, or distribution complex. The lower portion of FIG. 14 shows the activity on a typical play station #K used by a remote video player. FIG. 14 covers both on-site and off-site locations for a remote video player station. On-site locations are inside the premises of a casino and are physically controlled by the casino security staff. Off-site locations are at licensed locations not physically controlled by the casino, such as, for example, bars, adult clubs, card rooms, and licensed convenience stores. An initialization block 602 in FIG. 14 shows virtual gaming system operation beginning with a system power-up, initialization, and diagnostics process for the casino virtual gaming control center.

A decision block 604 in FIG. 14 receives information to determine whether a live player has actually sat down to play at a remote play station #K. If no live player has sat down at the remote player station #K, the system as per block 606, assembles or otherwise builds a "screen saver" type of multimedia packet for transmission to the remote play station #K. At the remote play station #K, a "screen-saver" mode is activated to present periodically updated advertisements or other special offers and to "attract attention" of potential players, using, for example, special-offer ads. This process is executed for all stations: 1, . . . , K, . . . , N.

If a live player has sat down at the remote play station #K, then the decision block 604 terminates the "attract attention" mode and initiates the player housekeeping mode block 605 which perform various system housekeeping functions. One of these functions is tracking a player's gaming profile through communication links to a player accounting and tracking module 608. Another function is authentication of a remote video player's financial and age eligibility using, for example, biometric data recorded on disks in a disk farm 610. Block 612 illustrates another function which is monitoring of the system for maintenance and dispatching of service personnel through a maintenance dispatch server system. These functional modules 608 and 610 reside within the player accounting server 42 of FIG. 1.

A decision block 614 of FIG. 14 determines if a player has newly "logged on" at an off-site location, such as a sanctioned remote-player site connected to an authorized Internet portal 52 of FIG. 1. If the player has just logged on, a download block 616 causes a "streaming multimedia player", such as the ones from Real Video, or Microsoft or Netscape or Lucent, or equal, to be downloaded, for example, through the regulated Internet portal 52 of FIG. 1 and installed at the remote player station #K. This enables the remote video player to begin play using a stream of compressed/encrypted, video/audio multimedia gaming data, being transmitted from the casino server 34 of FIG. 1 through various types of distributed networks, including the regulated Internet 50 of FIG. 1.

A decision block 618 determines if the game to be played is live or prerecorded. If the game is live, a certified autonomous RNG selector 620 is used to select output video and audio signals from a live video camera 622 in response to the choice of casino game selected by the remote video player. Alternatively, an optional bypass 621 is used to directly select video and audio signals from camera 622, subject to GCB approval. If the game is pre-recorded, a certified autonomous RNG selector 624 is used to select video and audio output video signal from a multimedia video database 626, such as a secure disk, tape, CD or other storage media-based farm 96 of FIG. 1, where the virtual gaming episode data is compressed, encrypted, encapsulated and then pre-stored.

In block 628 of FIG. 14 a compressed/encrypted streaming audio/video data packet is staged for routing via one of several possible communication pathways to the remote player station #K. In the download block 630, a selected multimedia video/audio data packet or a screen saver packet from block 606, as appropriate, is sent to the remote video player station #K from the casino virtual gaming server control center 34 of FIG. 1.

The remote player station block 632 of FIG. 14 illustrates the remote video player station #K first receiving, next de-encrypting, and then de-compressing the data packet from the casino virtual gaming server control center 48 of FIG. 1. A decision block 634 illustrates an authentication check of the off-site remote video player at the beginning of each game packet and periodically, for example, every 5 seconds using the pre-stored biometrics of the player, for example. The biometric data is provided, for example, as a video camera image of the player's face or retina (e.g., Sensar), fingerprint (e.g., Digital Privacy), driver's license, credit card, signature, voiceprint (e.g., Lucent), or casino player rating/tracking ID card. If the authentication check fails at the player accounting server 42 of FIG. 1, a block 636 provides that a session termination-and-notification packet is generated and sent to the casino virtual gaming server control center 48 of FIG. 1 so that the session is immediately terminated and local security personnel are informed and dispatched via messages to the surveillance server 26 of FIG. 1 as appropriate.

If the off-site unauthorized remote video player is accessing the casino gaming facility via the authorized Internet portal 50 of FIG. 1, then it is very difficult to dispatch local security personnel to apprehend a violator in a timely manner. However, a practical remote off-site player authentication process for a casino can also require that a large (e.g., $10,000) deposit or bond be posted at a neutral financial institution (i.e., a Bank) by the player, and that the deposit or bond is forfeited, if the biometrics authentication fails. To deter violations of gaming laws, additional criminal penalties including prison time and appropriate written waivers of legal rights can also be imposed. Gaming jurisdictions typically maintain that "gaming is a privilege and not a right". Prevention of underage gaming is a significant regulatory concern and typically requires continuous, unrestricted access by the regulators to any gaming related player station at any time. A 12-foot radius, for example, in front of the display can be monitored, using cameras and other electronic sensing means (e.g., motion detectors), to ensure that there are no underage (less than 21) individuals present, at all times. Gambling addiction is another problem that the regulated and responsible gaming community wants to curb. Continuous periodic multimedia biometrics authentication, together with bond forfeiture is disclosed as a means of meeting regulatory requirements by a casino. Biometric data can be continuously recorded at the game distribution processing complex using, for example, return path camera video, thereby enabling violations to be detected and recorded on-line and then prosecuted successfully. Continuous video taping of casino gaming areas is already required by the NV/CO/NJ State GCB. Thus, video/biometric monitoring of the remote player cannot be construed as an "invasion of privacy".

If the player is authenticated, a block 638 provides that the multimedia data stream is presented at the video display and speaker output ports of the player station #K, as per 54 and 46 in FIG. 1.

A decision block 640 of FIG. 14 illustrates monitoring of player input actions for a game when the player touches an action button on the touch-sensitive screen as per FIG. 10. Player input action requests made via a touch screen at the remote play station are continuously monitored. Block 640 tests whether a player has made a game input action or not. If a game input action has been made, a block 642 provides for assessment of that specific game input and for a local response, within 54 or 46 of FIG. 1, as appropriate, or for transmission of information to the casino virtual gaming server control center 34 of FIG. 1. If various other action button on the touch-sensitive screen are touched, the block 640 illustrates routing of that information to a block 644 which illustrates building of a command/status data packet. The block 644 also illustrates receipt of authentication failure information from the block 636.

The block 644 of FIG. 14 illustrates that the player station 54 or 46 of FIG. 1 builds an appropriate time-stamped data packet which includes current: (a) game progress/results as per FIGS. 12, 13, (b) player inputs as per FIGS. 11, 13, and (c) biometrics authentication sensor array data 374 of FIG. 1. Note the contents of this data packet are also determined by the requirements of the player accounting server 42 of FIG. 1 at the particular casino property. Block 646 shows that this packet is then compressed using, for example, PKZIP, encrypted using, for example, DES128 (as per NV-GCB) or RSA (key exchange). Recent cryptocode breaking advances indicate that the RSA key may have to be 1024 bits or larger. A block 648 illustrates a transmit request and transmission of an appropriate command/status packet for the remote video player station #K back to the virtual gaming distribution complex of the casino server control center 34 of FIG. 1.

Block 650 of FIG. 14 shows that the casino virtual gaming server control center of FIG. 1 receives and decodes the command/status packet for the remote video play station #K. The command/status information is then processed by being cycled through the processes in the casino server control center, as previously described.

Typically, all the secure communication pathways support bi-directional data packets that are asymmetric, that is, the forward path to the play station has a relatively high data rate of, for example, about 1 Mbps due to color video content. Whereas, the return path data rate is about 10 Kbps. However, the return path data rate can also be significantly greater, for example, if a video camera image of the player is continuously monitored for biometric authentication purposes.

Figure 15:
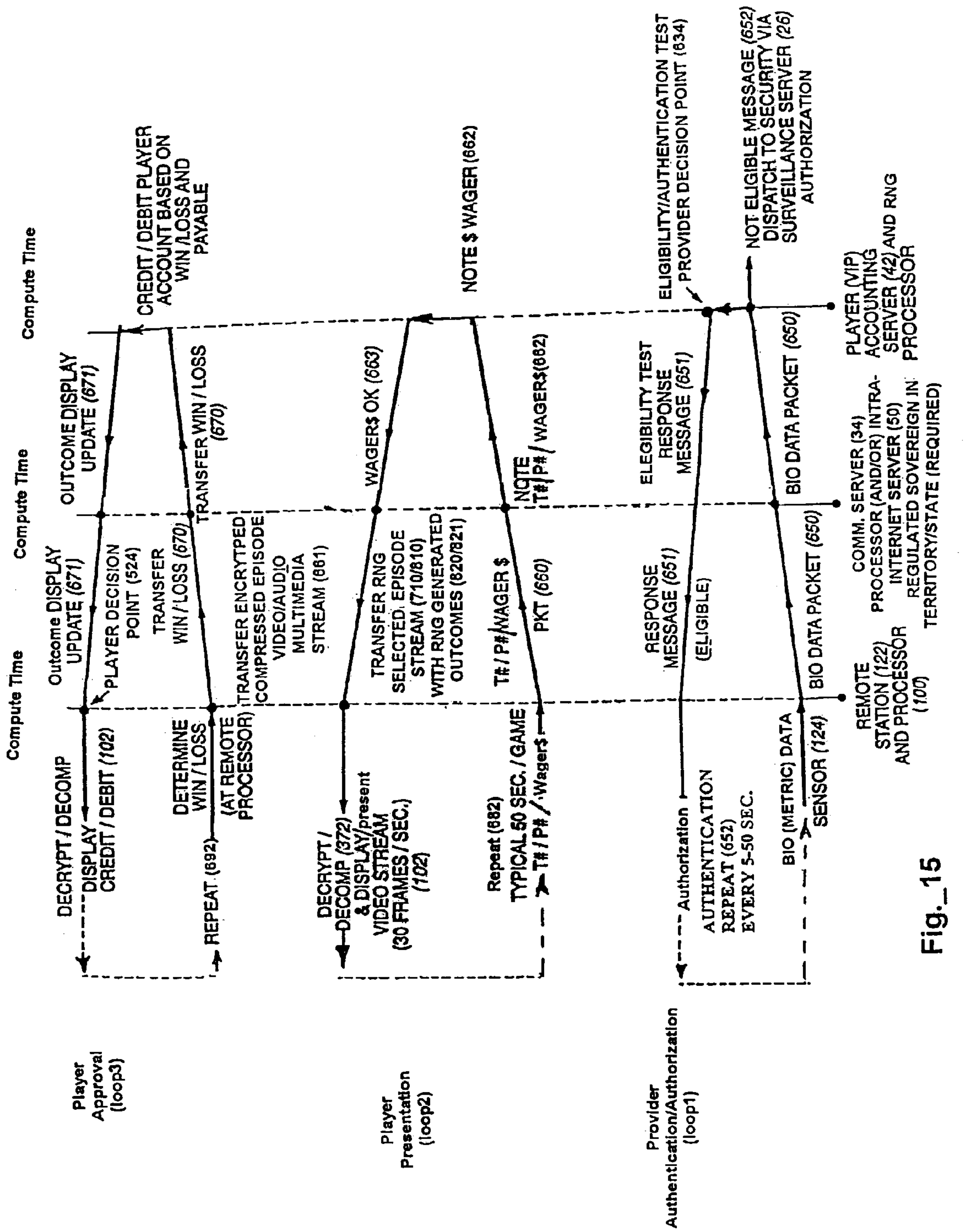
FIG. 15 shows a typical set of play mode related interprocessor information transfer sequences.

FIG. 15 in conjunction with FIG. 1 shows an exemplary protocol implementation of an interprocessor information transfer sequence, that is initiated by the remote player, when he sits down at the remote site player station 54 of FIG. 1. Biometric sensors 124 are immediately activated to collect appropriate biometric data and transfer a biometric data packet (650) to the player (e.g., VIP) accounting server (42) of FIG. 1 via the communication server (34) of FIG. 1, at appropriate (e.g., 5 second) intervals, as noted earlier. The accounting server (42) of FIG. 1 together with the possibly co-located casino hotel reservation/VIP guest server 41 of FIG. 1 rapidly (e.g., within 5 seconds) authenticates the biometric data (650) by comparing it to prestored or other credit reference database and acknowledges the eligibility (e.g., age, credit) of the remote player (651). The authentication must be done rapidly and the newly seated player must be "entertained", for example, with the casino's daily special offer, while this is being accomplished, otherwise the player will get impatient and may walk away from the remote player station 46 or 54 of FIG. 1. If there is an eligibility failure, then an information package (652) is also forwarded to the security dispatch center via the surveillance server (26) of FIG. 1. This authentication may also include additional surveillance sensor information processing to ensure that no underage individuals are in the regulated vicinity of the remote player station 46 or 54 of FIG. 1.

Then, the remote player can roam and select a particular table (T#) and player (P#) and place a wager dollar amount, as described previously via FIGS. 9-12. FIG. 15 shows that the T#/P# information is captured by the communication server (34) of FIG. 1 to send out the appropriate randomized video/audio stream (661) and the wager information (662) is noted by the accounting server (42) of FIG. 1 to send out a wager acknowledgment signal. The duration of each card table game is typically 50 seconds, as noted earlier.

Upon completion of the playback of the randomly selected video/audio stream (661), the win or loss result packet (670) of FIG. 15 can be determined by the remote station (54) or (46) based processor (100) and/or by the communication server (34), and/or the Internet Server (50) and/or by the player accounting server (42), as engineered by those skilled in the art of FIG. 1. Note that FIG. 15 shows the implementation, wherein the win or loss result packet (670) is determined by the remote processor (100) and then reported to the player accounting server (42) via the communication server (34) and/or Internet Server (50). The display (102) of FIG. 1 is appropriately updated with the game result (671) of FIG. 15, as shown. Note that the information packets between the various server processors are typically encrypted and compressed, as shown. Moreover, the win/loss report (670) of FIG. 15 first goes all the way back to the player (e.g., VIP) accounting server (42) of FIG. 1, so that in the credit card or cashless mode of wagering, the credit balance can be appropriately updated. Similar information packet transfer diagrams can be specified and then implemented by those skilled in the art to describe the information transfer sequence, when the remote player is in the (a) roam mode prior to making a gaming related selection, or (b) roam mode associated with the casino sponsored E-commerce (38) of FIG. 1 related products and services preview, as depicted in FIG. 10.

Figure 16:
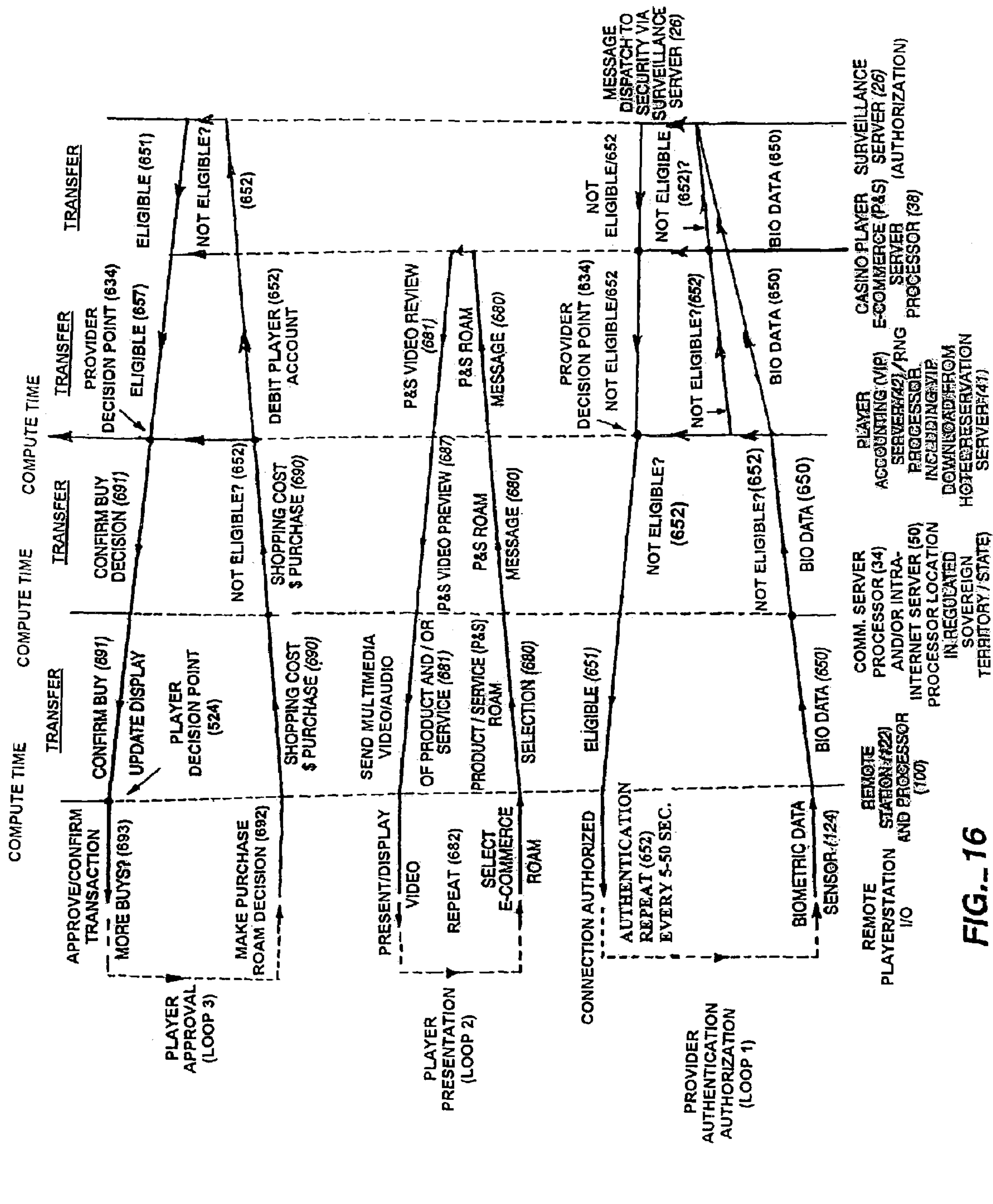
FIG. 16 shows a typical set of casino E-commerce roam mode related interprocessor information transfer sequences.

FIG. 16 shows the activation message (680) for the E-commerce product and services (P & S) roam mode, which is forwarded to both the accounting (42) and the E-commerce server (38) of FIG. 1, via the communication server (34) or Internet server (50) of FIG. 1. The E-commerce server (38) sends the P & S video preview stream (681) of FIG. 16 back to the remote station (122) of FIG. 1. The "relaxed" remote player (12) views the streaming multimedia P & S video (2D or 3D) and makes a purchase decision (990), akin to putting an item in a virtual shopping cart. The player accounting server (42) of FIG. 1 responds with a confirmation (691) of FIG. 16 of the buy decision, including a display (102) of FIG. 1 update at the remote player station on-site (46) or off-site (54) of FIG. 1. The multicomputer architecture facilitates the remote player to continue roaming (692) or to make additional buy decisions (693) as shown in FIG. 16. Note that the biometric authentication (652) is repeated every 5 seconds, or as per GCB directives. Also the E-commerce roam mode can be viewed indefinitely (682), but the eligible remote player casino policy can limit E-commerce roam time, if required.

FIG. 17 provides a comprehensive business process functional block diagram of the disclosed multimedia virtual gaming method and system based on actual regulated casino games comprised of three main elements, namely, (a) content creation 700, (b) content distribution 800, and (c) content presentation 900.

Gaming episode package content creation 700 consists of: (a) event generation 710, (b) acquisition of a series of "raw" episodes 720, and (c) gaming episode packaging 730.

Gaming content distribution 800 consists of retrieval or staging from: (a) storage medium 810 of virtual gaming episodes or direct feed of a live episode 820, (b) random episode selection based on a GCB certified RNG 830 or bypass 821, and (c) virtual episode package distribution 840. Note that near real-time delivered live episodes not susceptible to a "sting", may or may not be randomly selected, subject to GCB approval and casino policy. Moreover, content distribution 800, particularly via the regulated Internet Server (50) of FIG. 1, must be physically located in a sovereign state or Native American territory wherein Internet gaming is legally sanctioned.

Content presentation 900 consists of a player station which provides for: (a) casino property multimedia roaming and service selection/purchase, (b) presenting the selected virtual gaming episode, and (c) player authentication, in terms of biometric and other player attributes, and (d) player participation in terms of cash or credit or cashless wagering. The physical implementation of the ATM-like tamper-proof player virtual gaming station 46 or 54 of FIG. 1 is location dependent: versions include (1) casino floor, (2) casino wall, (3) casino hotel room, (4) off-site licensed facility (e.g., restricted GCB license), such as a (a) bar, (b) mall, (c) convenience store (e.g., 7-11), (d) department store, (e) motel (lobby, rooms), and (4) GCB authorized route operator sites (e.g., diners, restaurants, truck stops). Content presentation may also have to be in a physical location wherein gaming is legally sanctioned, particularly if credit cards are used for wagering purposes by the player. Note that GCB typically limits credit card losses on a per day basis, to deter problem gambling.

Additionally, the present invention discloses economically and technically important synergistic information communication links to ancillary systems necessary to meet requirements from both the GCB and the casino, to: (a) the surveillance multimedia control system 960, (b) the player accounting and authentication system 910, (c) casino-sponsored E-commerce product-service buy/sell/convenience system (e.g., shops, shows, discount offers, services, messages, securities) 920, (d) casino-hotel reservation (VIP) system 930, (e) the security dispatch system, and (f) maintenance and diagnostics system, interconnected by secure communication pathways 750, 760, 850, and 950, as per FIG. 17.

The foregoing descriptions of generic and specific embodiments of examples of the present invention have been presented for purposes of illustration and description. They are not intended to be exhaustive or to limit the invention to the precise forms disclosed, and obviously many modifications and variations are possible in light of the above teaching. The exemplary embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. An episode data distribution method comprising the steps of:

periodically virtually presenting to one or more remote-players at corresponding one or more multimedia stations randomly selected entertaining multimedia episode signals with independently randomly generated synthetic multimedia episode outcome signals appended thereto;

repeatedly acquiring remote-player authentication related data acquired by one or more biometric authentication sensors co-located with each of said one or more multimedia stations;

repeatedly transferring said authentication related data to a provider of said episodes to enable said provider to periodically approve episode based remote-player participation and accounting related data transactions;

periodically providing corresponding remote-player participation input based multimedia outcome signals and remote-player accounting related data updates to said remote-players at said stations;

wherein said multimedia episode signals comply with movie/TV entertainment industry presentation quality standards defined by Society-of-Motion-Picture-and-Television-Engineers (SMPTE);

wherein said authentication is performed multiple times during said episode presentation;

wherein each said randomly selected entertaining multimedia episode has independently randomly generated synthetic multimedia episode outcome signals appended thereto immediately upon receipt of said remote-player participation input; and wherein said episode outcome signals are synthetically generated using an independent episode related random number generation array based synthetic outcome multimedia generation array.

2. The distribution method of claim 1, wherein one or more said entertaining multimedia episode signals are stored in one or more multimedia storage buffers;

wherein said multimedia storage buffers are sized to store said multimedia episode signals complying with movie/TV entertainment industry standards defined by Society-of-Motion-Picture-and-Television-Engineers (SMPTE);

wherein said entertaining multimedia episode signals are randomly selected for retrieval from said multimedia storage buffers immediately upon receipt of the remote-player's participation input;

wherein episode outcome signals are independently randomly generated upon said receipt of the remote-player's participation input and appended to said entertaining multimedia episode signals;

wherein one or more entertaining multimedia episodes are transferred for virtual presentation to corresponding one or more remote-players playing on corresponding one or more multimedia stations; and wherein order of said random selection and said transfer is interchangeable.

3. The distribution method of claim 1, wherein one or more said entertaining multimedia episode signals are produced by a cast of one or more entertaining players virtually depicted in said entertaining multimedia episode signals; and wherein the cast of entertaining players have given prior authorization to provider of said episodes giving said provider each entertaining player's waiver of legal rights to privacy confidentiality and copyright with respect to participating in producing said entertaining multimedia episode signals.

4. A secure episode data distribution method comprising the steps of:

periodically securely virtually presenting to one or more remote-players at corresponding one or more multimedia stations one or more securely randomly selected securely produced entertaining multimedia episode signals with independent randomly generated synthetic multimedia episode outcome signals appended thereto;

repeatedly securely acquiring remote-player authentication related data acquired by one or more biometric authentication sensors co-located with each of said one or more multimedia stations;

repeatedly securely transferring said authentication related data to provider of said episodes to enable said provider to periodically approve episode based remote-player participation related and accounting related data transactions;

periodically securely providing corresponding remote-player participation input based multimedia outcome signals and remote-player accounting related data updates to said remote-players at said stations;

wherein said multimedia episode signals comply with movie/TV entertainment industry presentation quality standards defined by Society-of-Motion-Picture-and-Television-Engineers (SMPTE);

wherein said authentication is performed multiple times during said episode presentation;

wherein each securely produced said randomly selected multimedia episode has independent randomly generated synthetic multimedia episode outcome signals appended thereto immediately upon receipt of said remote-player participation input; and wherein said randomly generated synthetic multimedia episode outcome signals are generated using an independent episode related secure random number generation array based synthetic outcome multimedia generation array.

5. The distribution method of claim 4 including the step of:

securely transferring the remote-player's biometric authentication related and accounting related data from said multimedia stations to a gaming regulation management and surveillance center for periodic gaming-jurisdiction-authorization for corresponding one or more remote-players;

wherein each remote-player has given prior authorization to provider of said episodes giving said provider each remote-player's waiver of legal rights to privacy, confidentiality and security;

wherein said multimedia station is physically secure complying with banking industry standards pertaining to physical security of Automated-Transaction-Machines (ATMs);

wherein the provider approval periodicity to said remote players is substantially equal to the multimedia episode virtual presentation periodicity to said remote players;

wherein said participation input includes wagering from an approved account; and wherein both said episode provider's personnel and said remote-players are subject both to initial authorization and to ongoing periodic regulation by cognizant gaming-jurisdictional-entities.

6. The distribution method of claim 5, wherein the authorization and regulation of providers and participants in said episodes includes gaming-jurisdiction licensing of one or more entities selected from a group consisting of: game tournament facility operators, game equipment manufacturers, game service providers, Internet based game service providers, gaming route operators, restricted gaming operators, unrestricted gaming operators, arcade game facility operators, Native American gaming providers, wireless game providers, entertaining game players and remote game players.

7. The distribution method of claim 5, wherein approval of remote-player participation related accounting data updates is provided by a jurisdictionally licensed gaming episode provider entity, to ensure initial and ongoing compliance with respect to gaming-jurisdiction regulations;

wherein one or more said biometric authentication sensors are image based;

wherein image sensor based biometric authentication image of each remote-player is included in the multimedia episode virtual presentation to said remote-player to ensure compliance with the remote-player's prior authorization to provider of said episodes giving said provider each remote-player's waiver of legal rights to privacy, confidentiality and security; and wherein image sensor-based biometric authentication surveillance enables compliance with the initial authorization and ongoing periodic regulation of said remote-players and said provider's personnel.

8. The distribution method of claim 5 including the step of: distributing the multimedia-gaming-episode signals from gaming-jurisdiction authorized game events; and wherein said game events produce stored multimedia-gaming-episode signals depicting games being played by hired-for-consideration game players.

9. The distribution method of claim 8 including the step of:

distributing processed multimedia-gaming-episode signals of ongoing games presented at the multimedia-station;

wherein said ongoing games are securely stored in one or more multimedia storage buffers and securely presented in a cognizant gaming-jurisdiction-authorized sequence; and wherein said storage buffers are sized to store said multimedia gaming episode signals complying with movie/TV entertainment industry standards defined by Society-of-Motion-Picture-and-Television-Engineers (SMPTE).

10. The distribution method of claim 5, wherein paytable jackpots at one or more said multimedia stations is determined by the gaming provider on the basis of player tracking types of games, duration of games, and concurrency of games being played by said remote-player on said multimedia station, during one or more predefined periodic time intervals;

wherein said jackpot is a combination of cash and non-cash compensation; and wherein said combination is input by said remote-player's selection based on roaming on said multimedia stations for advertised product-service offers from said gaming provider.

11. The distribution method of claim 5, wherein said wagering by the remote-player is accomplished by placing wagers on one or more hired virtual-players playing to win said multimedia gaming episode; and wherein said wager is debited from said remote-player's pre-approved account to update said account, prior to virtual presentation of said randomly selected multimedia gaming episode together with a random synthetically generated episode outcome to said remote-player.

12. The distribution method of claim 11 including a business process step of:

enabling a gaming episode provider licensee to improve return-on-investment (ROI) by increasing the utilization of hired casino personnel, to facilitate the generation, processing, branding, presentation of the gaming episodes and surveillance of participating remote-players;

wherein said generation, processing, branding and presentation of the gaming episodes complies with movie/TV entertainment industry presentation quality standards defined by Society-of-Motion-Picture-and-Television-Engineers (SMPTE); and wherein surveillance of remote-players playing on multimedia stations located at gaming-jurisdiction-authorized remote locations is performed by said provider in accord with cognizant gaming jurisdiction authority's provider licensing standards including periodic authentication of said remote-players.

13. The distribution method of claim 9, wherein the games being played by hired-for-consideration players are selected from a group consisting of participants playing: Poker tournament, Card game tournament, Casino gaming, Professional sport tournament, Celebrity game tournament, Non-house stake gaming, Multi-player Parimutuel gaming, Unrestricted gaming tournaments, Unrestricted game tournament, Games-of-skill contests and Games-of-chance contests.

14. The distribution method of claim 11 including the step of:

hiring a cast of one or more virtual-players selected from a group consisting of casino game dealers, shills, casino game players, gaming industry personnel, gamblers, celebrities, entertainers, comedians, magicians, artists, actors, politicians, engineers, scientists, physicians, lawyers, educators, outdoor sports players, indoor sports players, game-of-skill players, game-of-chance players; and appealing hired entertaining players; and wherein gaming-jurisdiction-authorized field-trials enable assessment of appeal of each cast of hired virtual-players playing said games in terms of return-on-investment (ROI) from each set of participating remote-players during said field trials.

15. The distribution method of claim 5, wherein said virtual-players are hired to produce multi-media-gaming-episodes;

wherein said hiring process includes each of the hired virtual-player's presentation of said virtual-player's face and other identifying features in compliance with said virtual-player's prior authorization to provider of said episodes giving said provider each virtual-player's waiver of legal rights to privacy, confidentiality and copyright; and wherein the production of said multimedia-gaming-episodes complies with movie/TV entertainment industry presentation quality standards defined by Society-of-Motion-Picture-and-Television-Engineers (SMPTE).

16. The distribution method of claim 14 including the step of:

producing multimedia audio-video episodes with one or more entertaining cast of one or more hired virtual-players playing in audio-visually recorded multimedia-gaming-episodes;

wherein the multimedia episode production processes comply with movie/TV entertainment industry presentation quality standards defined by Society-of-Motion-Picture-and-Television-Engineers (SMPTE); and wherein gaming-jurisdiction-authorized one or more field-trials enable assessment of appeal of said cast of one or more hired virtual-players playing said games in terms of return-on-investment (ROI) from each set of one or more participating remote-players during said field-trials.

17. The distribution method of claim 16 including the step of:

locating the entertaining multimedia episode content-generation process in a gaming-jurisdiction-authorized jurisdictionally-delineated-zone that is selected from a group consisting of: casino facility, entertainment video production facility, video game production facility, professional sports facility, professional game facility, Native American gaming facility and gaming tournament facility.

18. The distribution method of claim 14 wherein a selected cast of virtual-players are cast and directed by a movie/TV entertainment industry director to play in a particular set of multimedia-gaming-episodes under production;

wherein multimedia episode production processes comply with movie/TV entertainment industry presentation quality standards defined by Society-of-Motion-Picture-and-Television-Engineers (SMPTE); and wherein gaming-jurisdiction-authorized field-trials enable assessment of appeal of said virtual-players playing said games under direction of said director in terms of return-on-investment (ROI) from each set of participating remote-players during said field-trials.

19. The distribution method of claim 14:

wherein the gaming-jurisdiction-authorized hired virtual-players have an entertainment value, based on return-on-investment(ROI) of games in which said hired virtual-players are hired to participate in episode production;

said return-on-investment(ROI) is used to assess said gaming-business multimedia-gaming-episode virtual-player casting decisions;

wherein multimedia episode production processes comply with movie/TV entertainment industry presentation quality standards defined by Society-of-Motion-Picture-and-Television-Engineers (SMPTE); and wherein gaming-jurisdiction-authorized field-trials enable assessment of appeal of said hired virtual-players playing said games in terms of return-on-investment (ROI) from each set of participating remote-players during said field-trials.

20. The distribution method of claim 14, wherein a cast of virtual-players is hired by a movie/TV entertainment industry producer to produce a cast based set of entertaining multimedia-gaming-episodes incorporating one or more games selected from a group consisting of: games-of-skill, and games-of-chance;

wherein the episode production processes comply with movie/TV entertainment industry presentation quality standards defined by Society of Motion Picture and Television Engineers (SMPTE); and wherein gaming-jurisdiction-authorized field-trials enable assessment of appeal of said cast of one or more virtual-players hired by said producer playing one or more of said games in terms of return-on-investment (ROI) from each set of participating remote-players during said field-trials.

21. The distribution method of claim 20 including the step of:

providing one or more of the multimedia-gaming-episode signals that depicts one or more games which are primarily games-of-skill.

22. The distribution method of claim 21, wherein one or more said games-of-skill are selected from a group consisting of: games involving primarily games-of-strategy-skill and games involving primarily games-of-sports-skill.

23. The distribution method of claim 22, wherein one or more said games-of-strategy-skill are selected from a group consisting of: chess game, checkers game, backgammon game, scrabble game, monopoly game, Riven game, Myst game, Pong game, Pac-Man game, Doom game, and related appealing games-of-strategy-skill; and wherein gaming jurisdiction authorized field-trials enable assessment of appeal of one or more said games being played by one or more sets of said cast of hired virtual-players in terms of return-on-investment (ROI) from each of one or more sets of participating remote-players during said field-trials.

24. The distribution method of claim 22, wherein one or more said games-of-sports-skill selected from a group consisting of: football game, basketball game, soccer game, rugby game, golf game, baseball game, professional sports tournament games, arcade games, and related appealing games-of-sports-skill; and wherein gaming jurisdiction authorized field-trials are used to assess appeal of said games being played by said hired virtual-players in terms of return-on-investment (ROI) from each set of participating remote-players during said field-trials.

25. The distribution method of claim 20, wherein the games-of-chance include Indian Gaming Regulatory Act (IGRA) class II casino games and class III casino games, and related appealing games-of-chance which appeal to remote-players; and wherein gaming jurisdiction authorized field-trials enable assessment of appeal of said games being played by said virtual-players hired by said producer in terms of return-on-investment (ROI) from each set of participating remote-players during said field-trials.

26. The distribution method of claim 11, wherein games-of-chance and games-of-skill based one or more said gaming episodes are selected from a group consisting of: Faro game, Monte game, Keno game, Bingo game, Fan-Tan game, Twenty-One game, Multi-action 21 game, Roulette game, Blackjack game, Seven-and-a-Half game, Big Injun game, Klondike game, Craps game, Poker game, Chuck-a-Luck game, Chinese Chuck-a-luck (Dai-Shu) game, Wheel-of-Fortune game, Chemin-de-Fir game, Baccarat game, Pai-Gow game, Beat-the-Banker game, Panguingui game, mini-baccarat game, Caribbean stud game, 7 card stud poker game, Texas hold'em poker game, Let-it-ride game, Video-Slot Machines based games, Video-Poker Machine based games, Dice-Match game, Ball-Match game, Card-Match game, Slot-Match game, Chess game, Checkers game, Backgammon game, Monopoly game, Scrabble game, Pinochle game, Harts game, Spades game, Doom game, Riven game, Pong game, Pac-Man game, Myst game, Golf game, Baseball game, Football game, Basketball game, Soccer game, Rugby game, Arcade Games, Horse-Racing game, Non-House-Stake Games, Multi-player Parimutuel games between a plurality of players, related appealing games-of-chance, and related appealing games-of-skill; and wherein gaming jurisdiction authorized field-trials enable assessment of appeal of each set of one or more said games being played by each set of one or more said hired virtual-players in terms of return-on-investment (ROI) from each set of participating remote-players playing said games during said field-trials.

27. An episode data distribution method comprising the steps of:

periodically virtually presenting to one or more remote-players at corresponding one or more multimedia game stations randomly selected entertaining multimedia episode signals with randomly generated multimedia episode outcome signals appended thereto;

periodically providing corresponding remote-player participation input based multimedia episode outcome signals and remote-player accounting related data updates to said remote-players at said multimedia game stations;

wherein said authentication is performed multiple times during said episode presentation;

wherein each said randomly selected entertaining multimedia episode has independent randomly generated synthetic multimedia episode outcome signals appended thereto immediately upon receipt of said participation input; and wherein said multimedia episodes outcome signals are synthetically generated using an independent episode related random number generation array based synthetic outcome multimedia generation array.

28. The distribution method of claim 27, wherein one or more said entertaining multimedia episode signals are stored in one or more multimedia storage buffers;

wherein the storage buffers are sized to store said multimedia episode signals in compliance with movie/TV entertainment industry presentation quality standards defined by Society-of-Motion-Picture-and-Television-Engineers (SMPTE);

wherein one or more selected said multimedia episode signals are transferred for virtual presentation to corresponding one or more remote-players playing on corresponding one or more multimedia game stations;

wherein said multimedia episode signals are selected by random retrieval from said multimedia storage buffers immediately upon receipt of the remote player's participation input; and wherein order of said selection and said transfer is interchangeable.

29. The distribution method of claim 27, wherein one or more said entertaining multimedia episode signals are produced by a participating cast of one or more entertaining players virtually presented in said entertaining multimedia episode signals;

wherein said cast of one or more entertaining players have given prior authorization to provider of said episodes giving said provider each entertaining player's waiver of legal rights to privacy confidentiality and copyright with respect to said entertaining multimedia episode signals; and wherein said multimedia episode signals are produced in compliance with movie/TV entertainment industry presentation quality standards defined by Society-of-Motion-Picture-and-Television-Engineers (SMPTE).

30. A secure episode data distribution method comprising the steps of:

periodically securely virtually presenting to one or more remote-players at corresponding one or more multimedia gaming stations one or more securely randomly selected securely produced entertaining multimedia episode signals with independent randomly generated synthetic multimedia episode outcome signals appended thereto;

periodically securely providing corresponding remote-players participation input based multimedia outcome signals and remote-player accounting related data updates to said remote-players at said multimedia gaming stations;

wherein said multimedia episode signals comply with movie/TV entertainment industry presentation quality standards defined by Society-of-Motion-Picture-and-Television-Engineers (SMPTE);

wherein each securely produced said randomly selected multimedia episode has independently randomly generated synthetic multimedia episode outcome signals appended thereto immediately upon receipt of said remote-player participation input; and wherein said multimedia episodes are generated using an episode related secure random number generation array based synthetic multimedia generation array.

31. The distribution method of claim 30 including the step of:

repeatedly securely transferring each remote-players legally pre-authorized authentication related data and accounting related data from biometric authentication sensors co-located at corresponding said multimedia gaming stations to a gaming regulation management surveillance center operated by licensed episode provider's personnel for periodic authorization to corresponding one or more said remote-players;

wherein both said episode providers personnel and said remote-players are subject both to initial authorization and to ongoing periodic regulation by a cognizant regulatory authority authorizing said biometric authentication;

wherein said surveillance center utilizes multimedia surveillance stations with co-located biometric sensors to accomplish said ongoing periodic gaming regulation;

wherein one or more of said biometric authentication sensors are image based;

wherein remote-player related data legally pre-authorized by each said remote-player is acquired and processed in accord with legal authorization related privacy, confidentiality and security considerations.

32. The distribution method of claim 31, wherein said multimedia gaming and surveillance stations are physically secure in compliance with banking industry standards pertaining to physical security of Automated-Transaction-Machines (ATMs); and wherein said multimedia gaming and surveillance stations are functionally secure in compliance with gaming industry standards defined by a cognizant regulatory authority.

33. The distribution method of claim 31, wherein one or more image sensor based biometric authentication images of said remote-player is included in the multimedia episode virtual presentation to said remote-player at said multimedia gaming station to enable said remote-player's privacy and confidentiality to be maintained during the authentication process by episode provider's personnel to comply with said remote player's prior authorization given to said episode provider thereby giving said episode provider a waiver of legal rights by said remote player; and wherein one or more image sensor based biometric authentication images of said provider's personnel are included in a surveillance presentation at said multimedia surveillance stations to assure authentication periodicity of said ongoing periodic regulation.

34. The distribution method of claim 33, wherein two image sensors are used to acquire a pair of images for remote-player biometric authentication in support of surveillance presentation to said episode provider's personnel and virtual presentation to said remote-player.

35. The distribution method of claim 30, wherein each remote player's said participation input includes said remote-player wagering from a licensed provider approved account;

wherein said wagering by remote-player is comprises of placing wagers on one or more virtual-players playing said multimedia gaming episode; and wherein said wager is debited from said remote-player's pre-approved account to update said account, prior to virtual presentation of said randomly selected multimedia gaming episode together with a random synthetically generated episode outcome to said remote-player.

36. The distribution method of claim 35, wherein said wagering by said remote-player includes placing a wager on said remote-player personally participating in playing randomly selected virtually presented said multimedia gaming episodes being played by hired entertaining players with randomly synthetically generated episode outcomes appended thereto.

37. The distribution method of claim 30, wherein a cast of virtual-players is hired by an entertainment production industry producer to produce a cast based set of entertaining multimedia-gaming-episodes incorporating one or more games selected from a group consisting of: games-of-skill, and games-of-chance; and wherein episode production and presentation processes comply with movie/TV entertainment industry presentation quality standards defined by Society-of-Motion-Picture-and-Television-Engineers (SMPTE).

38. The distribution method of claim 37 including the step of:

hiring a cast of one or more virtual-players selected from a group consisting of casino game dealers, shills, casino game players, gaming industry personnel, gamblers, celebrities, entertainers, comedians, magicians, artists, actors, politicians, engineers, scientists, physicians, lawyers, educators, outdoor sports players, indoor sports players, game-of-skill players, game-of-chance players; and appealing individuals; and wherein field-trials enable assessment of appeal of each of one or more casts of hired virtual-players playing said games in terms of return-on-investment (ROI) from each of one or more sets of participating remote-players during said field-trials.

39. The distribution method of claim 37, wherein said games-of-chance and games-of-skill based one or more said gaming episodes are selected from a group consisting of: Faro game, Monte game, Keno game, Bingo game, Fan-Tan game, Twenty-One game, Multi-action 21 game, Roulette game, Blackjack game, Seven-and-a-Half game, Big Injun game, Klondike game, Craps game, Poker game, Chuck-a-Luck game, Chinese Chuck-a-luck (Dai-Shu) game, Wheel-of-Fortune game, Chemin-de-Fir game, Baccarat game, Pai-Gow game, Beat-the-Banker game, Panguingui game, mini-baccarat game, Caribbean stud game, 7 card stud poker game, Texas hold'em poker game, Let-it-ride game, Video-Slot Machines based games, Video-Poker Machine based games, Dice-Match game, Ball-Match game, Card-Match game, Slot-Match game, Chess game, Checkers game, Backgammon game, Monopoly game, Scrabble game, Pinochle game, Harts game, Spades game, Doom game, Riven game, Pong game, Pac-Man game, Myst game, Golf game, Baseball game, Football game, Basketball game, Soccer game, Rugby game, Arcade Games, Horse-Racing game, Non-House-Stake Games, Multi-player Parimutuel games, related appealing games-of-chance, and related appealing games-of-skill;

wherein field-trials enable assessment of appeal of one or more said games in terms of return-on-investment (ROI) from each of one or more sets of participating remote-players;

wherein said remote-players are wagering on virtually presented games-of-chance and games-of-skill selected by said remote-players during said field-trials; and wherein the virtual presentation depicts a cast of entertaining players hired by an episode producer.

* * * * *